(12) United States Patent  
Sun

(10) Patent No.: US 9,817,170 B2  
(45) Date of Patent: Nov. 14, 2017

(54) DISPLAY APPARATUS AND ELECTRONIC DEVICE

(71) Applicant: Lenovo (Beijing) Co., Ltd., Beijing (CN)

(72) Inventor: Bingchuan Sun, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 150 days.

(21) Appl. No.: 14/638,335

(22) Filed: Mar. 4, 2015

(65) Prior Publication Data

US 2016/0189579 A1 Jun. 30, 2016

(30) Foreign Application Priority Data

Dec. 30, 2014 (CN) .......................... 2014 1 0843210

(51) Int. Cl.
*G09G 3/00* (2006.01)
*F21V 8/00* (2006.01)
(Continued)

(52) U.S. Cl.
CPC .......... *G02B 6/0011* (2013.01); *G02B 27/017* (2013.01); *G06F 1/163* (2013.01);
(Continued)

(58) Field of Classification Search
CPC ....... G09G 3/002; G02B 6/0011; G02B 27/30
(Continued)

(56) References Cited

U.S. PATENT DOCUMENTS 7,046,215 B1 * 5/2006 Bartlett ................... G01S 5/163
345/8
2004/0109135 A1 * 6/2004 Watanabe ............ A61B 3/1225
351/205
(Continued)

FOREIGN PATENT DOCUMENTS

CN 103688208 3/2014
CN 203811898 U 9/2014
(Continued)

OTHER PUBLICATIONS

Office Action dated Oct. 1, 2015 out of corresponding German Patent Application No. 102015103310.0 and its English Translation (12 pages).
(Continued)

*Primary Examiner* — Carolyn R Edwards
(74) *Attorney, Agent, or Firm* — Brinks Gilson & Lione; G. Peter Nichols

(57) ABSTRACT

A display apparatus and an electronic device are described. The display apparatus includes a display component configured to output displaying light corresponding to a first image and a light path converting component configured to perform light path conversion on the displaying light. The light path converting component unit includes a collimating unit and a waveguide unit. The collimating unit is configured to collimate the displaying light into collimated light, and lead the collimated light into the waveguide unit. The waveguide unit is configured to exit the collimated light to form a virtual image at a predetermined position, with a size of the virtual image being greater than a display size of the display component. An image acquiring component is configured to receive photographing light from external side of the display apparatus via at least part of the waveguide unit
(Continued)

to obtain a second image corresponding to the photographing light.

12 Claims, 33 Drawing Sheets

(51) Int. Cl.
    *G06F 1/16*       (2006.01)
    *G02B 27/01*     (2006.01)

(52) U.S. Cl.
    CPC ............... *G02B 2027/0178* (2013.01); *G02B 2027/0181* (2013.01)

(58) Field of Classification Search
    USPC ........................................ 345/7–9
    See application file for complete search history.

(56) References Cited

U.S. PATENT DOCUMENTS

| | | | |
|---|---|---|---|
| 2008/0123908 A1* | 5/2008 | Waldman | G06K 9/00046 382/124 |
| 2008/0158685 A1 | 7/2008 | Amitai | |
| 2011/0134017 A1* | 6/2011 | Burke | G02B 27/0101 345/32 |
| 2012/0162549 A1 | 6/2012 | Gao | |
| 2013/0222384 A1* | 8/2013 | Futterer | G02B 5/32 345/426 |

FOREIGN PATENT DOCUMENTS

| | | |
|---|---|---|
| CN | 204374517 U | 6/2015 |
| DE | 603 15 606 T2 | 5/2008 |
| WO | WO 2012/062682 | 5/2012 |

OTHER PUBLICATIONS

First Office Action dated Sep. 26, 2017 (15 pages including English translation) in corresponding Chinese priority Application 201410843210.7.

* cited by examiner

DISPLAY APPARATUS AND ELECTRONIC DEVICE

This application claims priority to 201410843210.7 filed on Dec. 30, 2014, the entire contents of which are incorporated herein by reference.

The present application relates to the field of display apparatus, and more particularly, to a display apparatus and an electronic device using the display apparatus.

BACKGROUND

An electronic device is often equipped with a display, such as liquid crystal display (LCD), organic electroluminescent display, organic light emitting diode (OLED) display etc. When size of the electronic device itself is limited (e.g., the electronic device is a wearable electronic device like a smart watch, smart glasses or an HMD (head-mounted display) device, if equipped with only a display, usually its display area is quite small, only limited information can be displayed. A display apparatus based on light guide optical element (LOE) is already proposed, it can provide image or video display with larger size and higher resolution without being restricted by size of the wearable electronic device itself, like a smart watch.

The current LOE display apparatus can only be used as a display equipment, if needs to execute control input and/or image acquisition, then it needs to arrange an input component and an image capturing component additionally, hence, cost is increased, and meanwhile miniaturization of the apparatus is also influenced. It is therefore desirable to provide a display apparatus and an electronic device using the display apparatus, which can implement image acquisition and control input based on acquired image by means of multiplexing of the display light path and the image acquiring light path while providing image or video display with larger size and higher resolution without increasing cost or volume thereof additionally.

SUMMARY

According to an embodiment of the present application, there is provided a display apparatus, comprising: a display component configured to output displaying light corresponding to a first image; and a light path converting component configured to perform light path conversion on the displaying light, the light path converting component unit comprising a collimating unit and a waveguide unit, the collimating unit configured to collimate the displaying light into collimated light, and lead the collimated light into the waveguide unit; the waveguide unit configured to exit the collimated light to form a virtual image at a predetermined position, a size of the virtual image being greater than a display size of the display component; an image acquiring component configured to receive photographing light from external side of the display apparatus via at least part of the waveguide unit, to obtain a second image corresponding to the photographing light.

According to another embodiment of the present application, there is provided an electronic device, comprising: a body apparatus that comprises a processing component configured to generate a first image to be displayed and execute display control; a fixing apparatus connected with the body apparatus and configured to fix a position relationship relative to a user of the electronic device; and a display apparatus provided within the body apparatus and/or the fixing apparatus, wherein the display apparatus comprises: a display component configured to output displaying light corresponding to a first image; and a light path converting component configured to perform light path conversion on the displaying light, the light path converting component unit comprising a collimating unit and a waveguide unit, the collimating unit configured to collimate the displaying light into collimated light, and lead the collimated light into the waveguide unit; the waveguide unit configured to exit the collimated light to form a virtual image at a predetermined position, a size of the virtual image being greater than a display size of the display component; an image acquiring component configured to receive photographing light from external side of the display apparatus via at least part of the waveguide unit, to obtain a second image corresponding to the photographing light.

DETAILED DESCRIPTION

Hereinafter, the embodiments of the present application will be described in detail with reference to the accompanying drawings.

First, a display apparatus according to an embodiment of the present application will be described with reference to FIGS. 1 to 12B. The display apparatus according to an embodiment of the present application may be applied to any electronic device that includes a display apparatus (that is, the display of the electronic device in some cases), which may be a wearable electronic device or any other type of electronic device. Those skilled in the art will readily appreciate that, in the case of applying the display apparatus according to an embodiment of the present application to a wearable electronic device, the wearable electronic device may be, but not limited to, a headset or wrist-mounted electronic device.

Figure 1A:
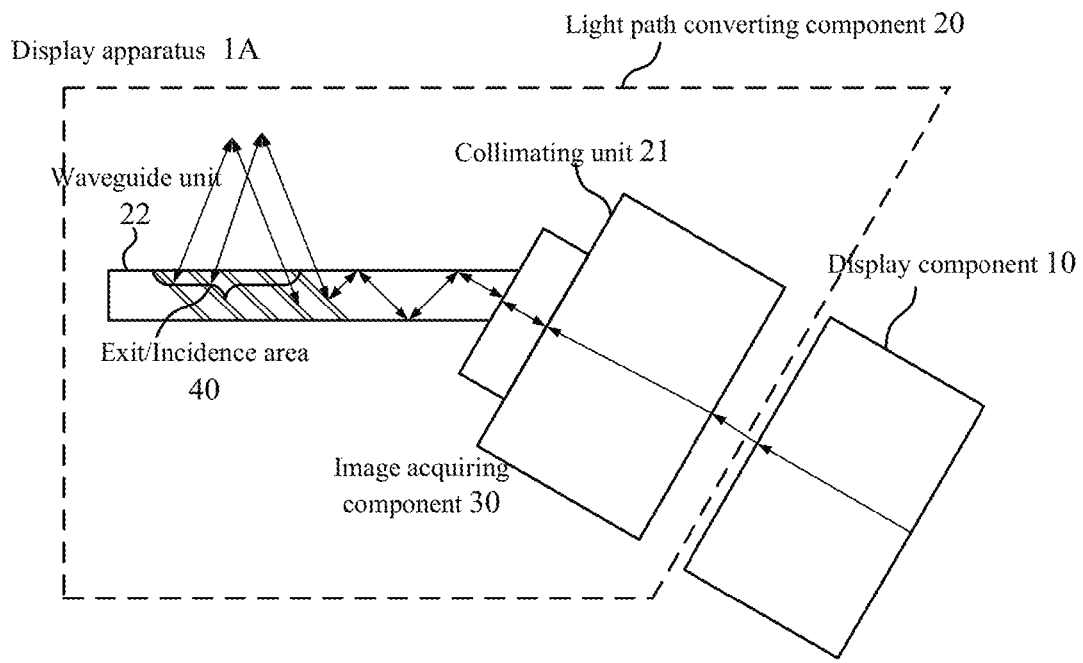
FIGS. 1A to 1C are structural block diagrams respectively illustrating a display apparatus according to a first exemplary embodiment of the present application.
Figure 1B:
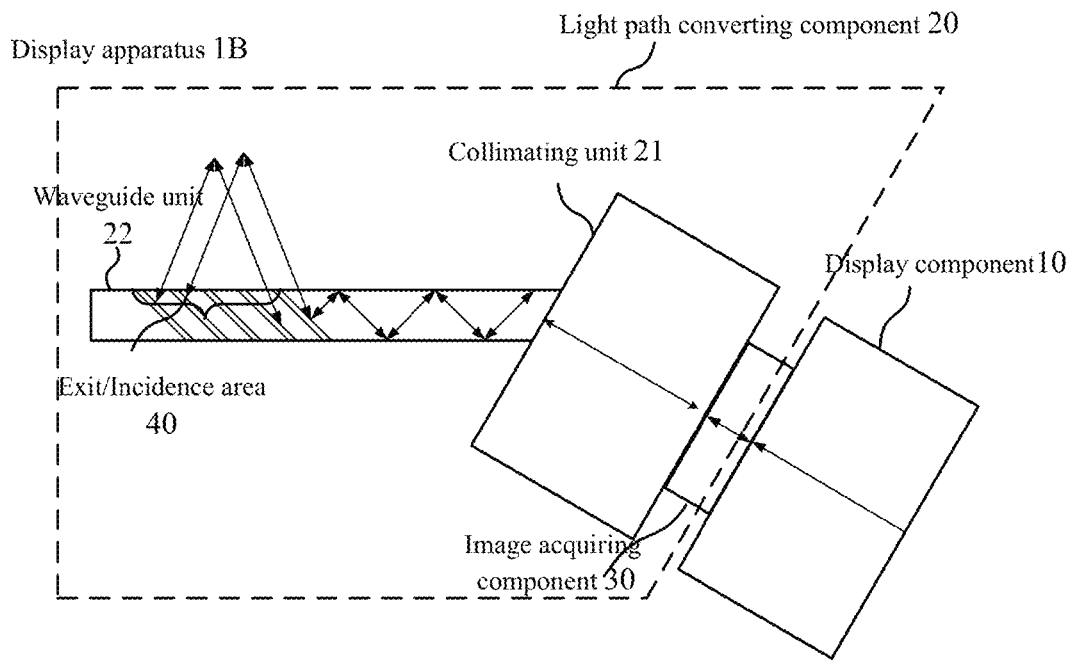
Figure 1C:
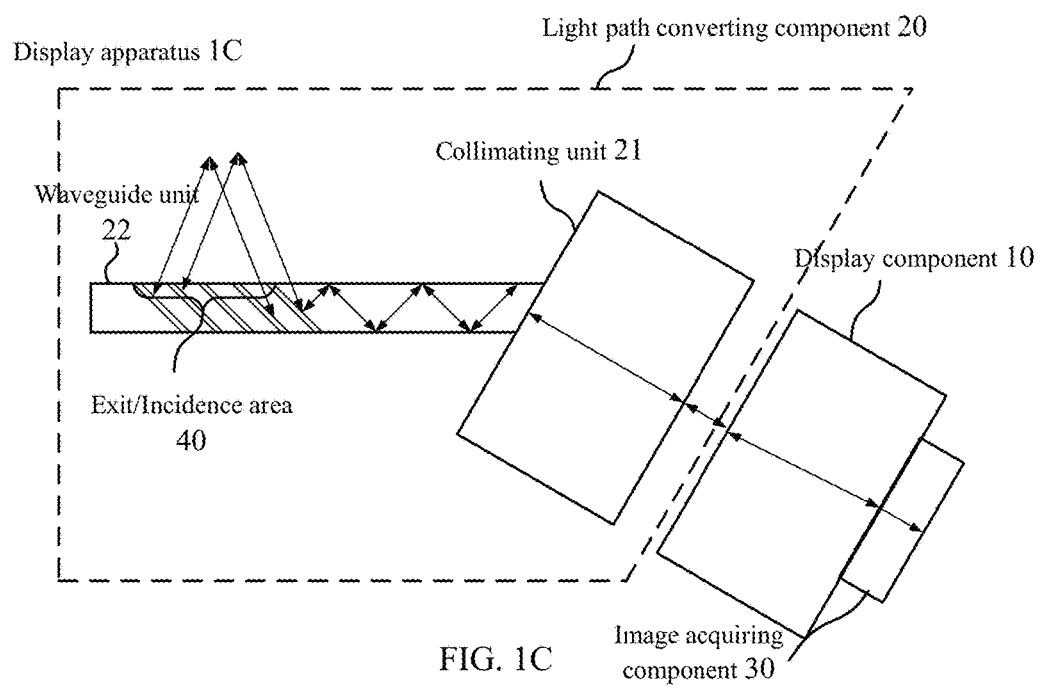

FIGS. 1A to 1C are structural block diagrams respectively illustrating a display apparatus according to a first exemplary embodiment of the present application. As shown in FIGS. 1A to 1C, the display apparatus 1A to 1C according to an embodiment of the present application includes a display component 10, a light path converting component 20, and an image acquiring component 30. The display component 10 is configured to output displaying light corresponding to a first image to be displayed by the display apparatus 1A to 1C (light indicated by the solid-line arrow from right to left shown in FIG. 1). The light path converting component 20 is configured to perform light path conversion on the displaying light. In an embodiment of the present application, the display component 10 may be for example a self-luminous type display component like an organic light emitting diode (OLED) display, may also be a backlight type display component like a liquid crystal display. The light path converting component 20 may include lens group for collimating and amplifying an image and a waveguide chip or a flexible waveguide for changing an exit direction of the image and so on. Specifically, the light path converting component unit 20 includes a collimating unit 21 and a waveguide unit 22, the collimating unit 21 is configured to collimate the displaying light into collimated light, and lead the collimated light into the waveguide unit 22; the waveguide unit is configured to exit the collimated light to form a virtual image at a predetermined position, a size of the virtual image is greater than a display size of the display component. As shown in FIGS. 1A to 1C, the predetermined position is an area where a backward extension line of the displaying light residues, wherein the virtual image corresponding to the first image can be perceived by a viewer at a predetermined position. It is possible to image toward the predetermined position by the light path converting component 20 as needed by design, for example, as shown in FIGS. 1A to 1C, the predetermined position may be either side with respect to the light path converting component 20. In an embodiment of the present application, the display apparatus 1A to 1C as shown in FIGS. 1A to 1C is configured in a wrist-mounted electronic device, the display component 10 is provided at a first side with respect to the light path converting component 20, the predetermined position where image is formed is at the side same as the first side, and the user of the wrist-mounted electronic device views at a second side, the other side with respect to the light path converting component. In another embodiment of the present application, the display apparatus 1A to 1C as shown in FIGS. 1A to 1C is configured in a headset electronic device, the display component 10 is provided at a first side with respect to the light path converting component 20, the predetermined position where image is formed is at a second side, the other side with respect to the light path converting component, and the user of the headset electronic device views at the first side. In this way, the display apparatus 1A to 1C according to the embodiment of the present application as shown in FIGS. 1A to 1C can provide image or video display with larger size and higher resolution at the predetermined position without being restricted by size of the electronic device that is equipped with the display apparatus 1A to 1C.

The image acquiring component 30 is configured to receive photographing light from external side of the display apparatus via at least part of the waveguide unit 22 (light indicated by the solid-line arrow from left to right shown in FIG. 1), to obtain a second image corresponding to the photographing light. The image acquiring component 30 may be constructed by a charge coupled device (CCD) sensor, a complementary metal oxide semiconductor (CMOS) and so on.

As shown in FIGS. 1A to 1C, the displaying light exits from a predetermined area (i.e., exit/incidence area 40) of the waveguide unit 22, and the photographing light enters from the predetermined area. The present application is not limited thereto, an exit area of the displaying light and an incidence area of the photographing light may be partially overlapped, or alternatively, an exit area of the displaying light and an incidence area of the photographing light may be the different from each other.

In the case where an exit area of the displaying light and an incidence area of the photographing light are the same predetermined area, because of the reversibility of light paths that exit and enter from the same exit/incidence area 40 in the display apparatus 1A to 1C, a first light path of the displaying light may include a second light path of the photographing light, or the second light path may include the first light path.

Specifically, as shown in FIG. 1A, the image acquiring component 30 is provided between the waveguide unit 22 and the collimating unit 21. A unidirectional transmittance of the image acquiring component 30 satisfies a predetermined condition (e.g., its unidirectional transmittance≥90%). In the light path configuration of the display apparatus 1A as shown in FIG. 1A, on the first light path of the displaying light, the displaying light corresponding to the first image as emitted from the display component 10 is collimated by the collimating unit 21 as collimated light. A unidirectional transmittance of the image acquiring component 30 at a side that contacts with the collimating unit 21 satisfies a predetermined condition, so that the collimated light transmits through the image acquiring component 30, and thereafter is exited via the waveguide unit 22, thus forming a virtual image at a predetermined position. On the second path of the photographing light, the photographing light that enters via at least part of the waveguide unit 22 is acquired by the image acquiring component 30 to acquire a second image corresponding to the photographing light. In the light path configuration as shown in FIG. 1A, the first light path of the displaying light includes the second light path of the photographing light.

Likewise, as shown in FIG. 1B, the image acquiring component 30 is provided between the collimating unit 21 and the display component 10. In the light path configuration of the display apparatus 1A as shown in FIG. 1A, on the first light path of the displaying light, a unidirectional transmittance of the image acquiring component 30 at a side that contacts with the display component 10 satisfies a predetermined condition, the displaying light corresponding to the first image as emitted from the display component 10 transmits through the image acquiring component 30, then it is collimated by the collimating unit 21 as collimated light corresponding to the first image and exited via the waveguide unit 22, thus forming a virtual image corresponding to the first image at a predetermined position. On the second path of the photographing light, the photographing light that enters via at least part of the waveguide unit 22 is acquired by the image acquiring component 30 after traveling through the collimating unit 21 along an inverse light path, to acquire a second image corresponding to the photographing light. In the light path configuration as shown in FIG. 1B, the first light path of the displaying light includes the second light path of the photographing light.

Likewise, as shown in FIG. 1C, the image acquiring component 30 is provided after the display component 10. In the light path configuration of the display apparatus 1C as shown in FIG. 1C, on the first light path of the displaying light, the image acquiring component 30 does not affect the displaying light corresponding to the first image. On the second path of the photographing light, the photographing light that enters via at least part of the waveguide unit 22 is acquired by the image acquiring component 30 after traveling through the collimating unit 21 and the display component 10 along an inverse light path, to acquire a second image corresponding to the photographing light. In the light path configuration as shown in FIG. 1C, the second light path of the displaying light includes the first light path of the photographing light.

Figure 2:
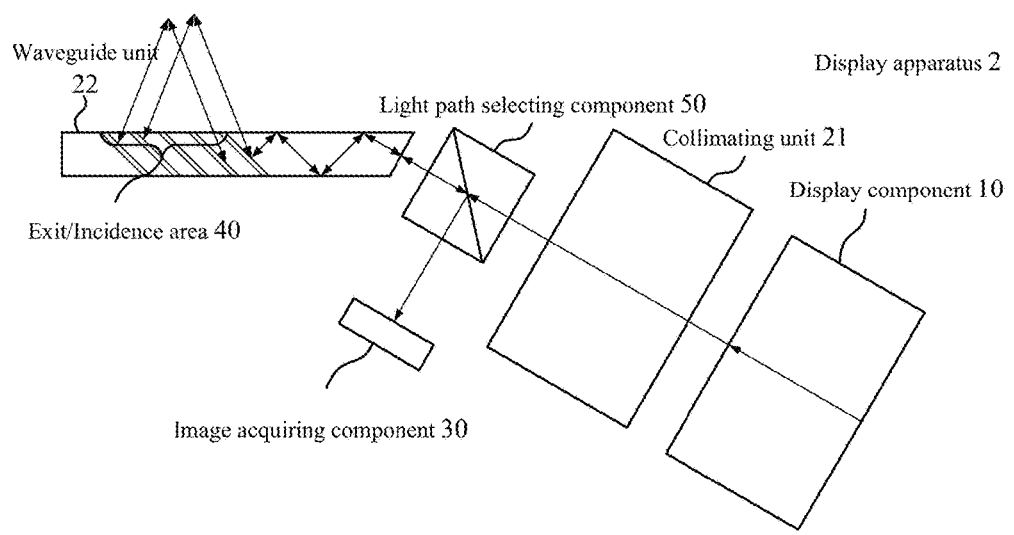
FIG. 2 is a structural block diagram illustrating a display apparatus according to a second exemplary embodiment of the present application.

FIG. 2 is a structural block diagram illustrating a display apparatus according to a second exemplary embodiment of the present application. As shown in FIG. 2, the display apparatus 2 according to the second exemplary embodiment of the present application further comprises a light path selecting component 50. In the display apparatus 2 as shown in FIG. 2, the light path selecting component 50 is provided between the waveguide unit 22 and the collimating unit 21. The light path selecting component 50 is a polarization beam splitter (PBS) component. On the first light path of the displaying light, the collimated light corresponding to the first image transmits through the light path selecting component 50, to be exited via the waveguide unit 22 along the first light path. On the second light path of the photographing light, the photographing light that enters via at least part of the waveguide unit 22 is reflected by the light path selecting component 50, to be acquired by the image acquired component 30 along the second light path. In this case, the image acquiring component 30 is provided at the reflection path of the light path selecting component 50, the waveguide unit 22 is provided at the transmittance path of the light path selecting component 50. In the display apparatus 2 as shown in FIG. 2, the first light path of the displaying light and the second light path of the photographing light are partially overlapped, that is, the first light path of the displaying light and the second light path of the photographing light are partially overlapped on the waveguide unit 22 and the light path selecting components.

Figure 3A:
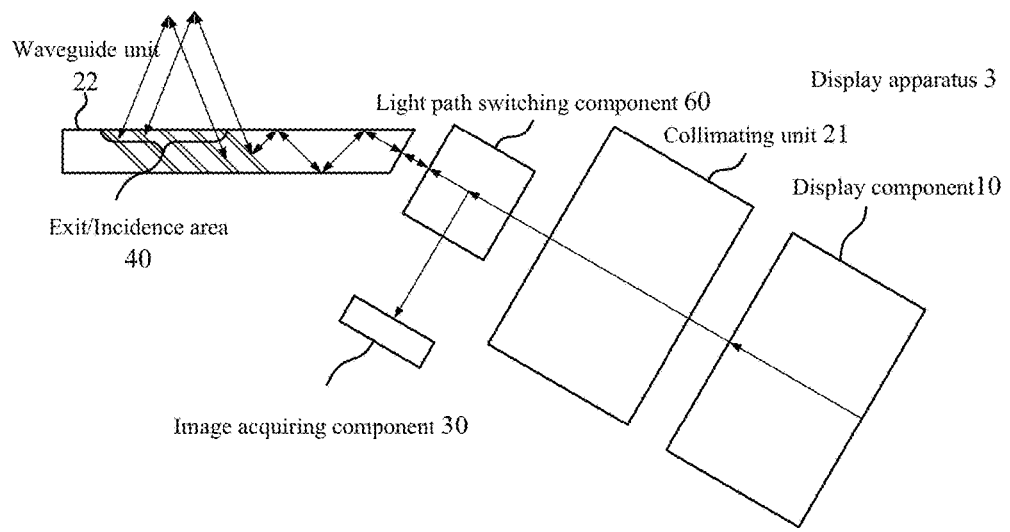
FIGS. 3A to 3C are structural block diagrams respectively illustrating a display apparatus according to a third exemplary embodiment of the present application.
Figure 3B:
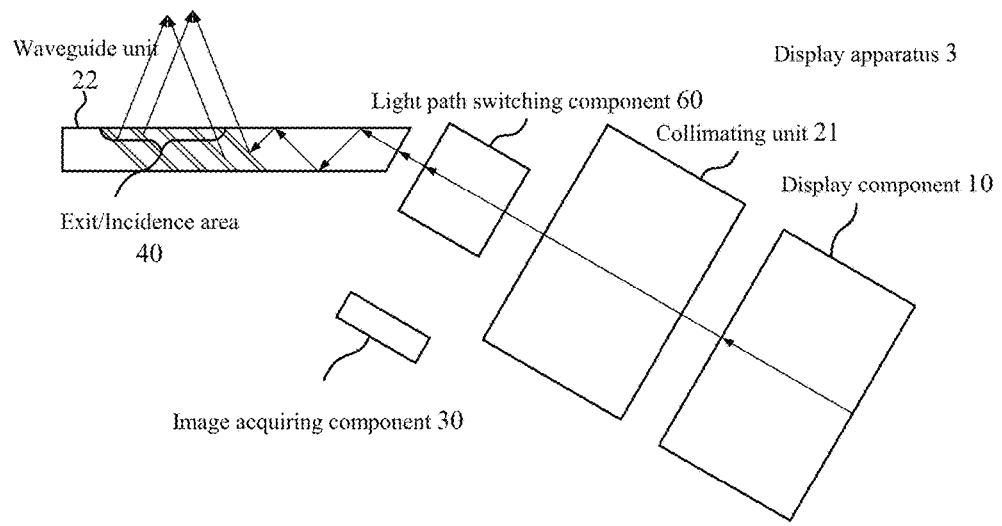
Figure 3C:
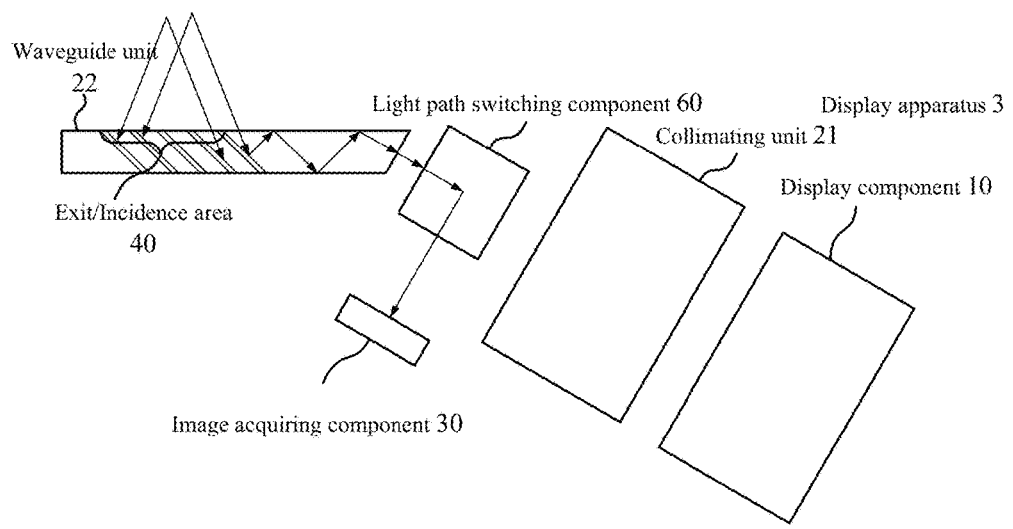

In the first and second exemplary embodiments as shown in FIGS. 1A to 2, the display apparatus according to the embodiments of the present application can concurrently execute display of the first image and acquisition of the second image. Further description will be provided in detail below with reference to FIGS. 3A to 3C, so it is possible to selectively control the display apparatus according to the embodiments of the present application to execute one or two of the above functions according to a different using scenario and user instruction. FIGS. 3A to 3C are structural block diagrams respectively illustrating a display apparatus according to a third exemplary embodiment of the present application. The display apparatus 3 as shown in FIGS. 3A to 3C is further configured with a light path switching component 60.

As shown in FIG. 3A, the display apparatus 3 according to the third exemplary embodiment of the present application is in a first operating state of concurrently executing display of the first image and acquisition of the second image, in the first operating state, the light path switching component 60 leads the collimated light corresponding to the first image into the waveguide unit 22, and leads the photographing light from external side of the display apparatus via the waveguide unit 22 to the image acquiring component 30. In an application example, in the case where the display apparatus 3 is configured in the headset electronic device that is worn by the user, when the display apparatus 3 in a first operating state of concurrently executing display of the first image and acquisition of the second image, the second image acquired by the image acquiring component 30 may be display overlapped on the first image as an realistic image corresponding to a sight line of the user, thus achieving reality-augmented display effect. In another application example, in the case where the display apparatus 3 in a first operating state of concurrently executing display of the first image and acquisition of the second image, as will be described in detail below, the second image acquired by the image acquiring component 30 may be used for identifying user identity and authority. And in yet another application example, the second image acquired by the image acquiring component 30 may serve as the first image and be displayed in the display apparatus 3.

As shown in FIG. 3B, the display apparatus 3 according to the third exemplary embodiment of the present application is in a second operating state of executing display of the first image. In the second operating state, the light path switching component 60 leads the collimated light into the waveguide unit 22. In this application scenario, the display apparatus 3 only executes display of image or video, does not acquire an external image.

As shown in FIG. 3C, the display apparatus 3 according to the third exemplary embodiment of the present application is in a third operating state of executing acquisition of the second image. In the third operating state, the light path switching component 30 leads the photographing light from external side of the display apparatus via the waveguide unit 22 to the image acquiring component 30. In this application scenario, the display apparatus 3 will stop the displaying of the first image, and functions as a camera or Videocon, to acquire an external image and store the acquired second image for subsequently displaying it as the first image.

Based on design needs and application scenarios, the display apparatus according to the embodiment of the present application and the electronic device configured with the display apparatus can have only the first operating state of concurrently executing display of the first image and acquisition of the second image; alternatively, it may have the first operating state of concurrently executing display of the first image and acquisition of the second image and the second operating state of executing display of the first image; alternatively, it may have the first operating state of concurrently executing display of the first image and acquisition of the second image, the second operating state of executing display of the first image, and the third operating state of executing acquisition of the second image.

It needs to be noted that, in the case where the light path switching component 60 is configured, the relative position of the waveguide unit 22 and the image acquiring component 30 as shown in FIGS. 3A to 3C is only schematic, they may be configured on the light guide path of the light path switching component 60 as needed. In addition, the light path switching component 60 may adopt a polarization beam splitter component capable of simultaneously performing the light path switching function, and may also adopt a component that satisfies a predetermined condition frequency (e.g., higher than a predetermined switching frequency) and time-sharing performs the light path switching function.

FIGS. 4A to 4D are schematic diagrams respectively illustrating a first application example of a display apparatus according to an embodiment of the present application. As discussed above, the display apparatus according the embodiment of the present application has the function of executing display of the first image and acquisition of the second image, in the first application example as shown in FIGS. 4A to 4D, the second image is the image acquired by the display apparatus (e.g., an image of an operating body of the display apparatus). It is possible to, by means of identifying image acquired by the image acquiring component 30, generate a first control instruction based on the identified image to control the display apparatus.

Figure 4A:
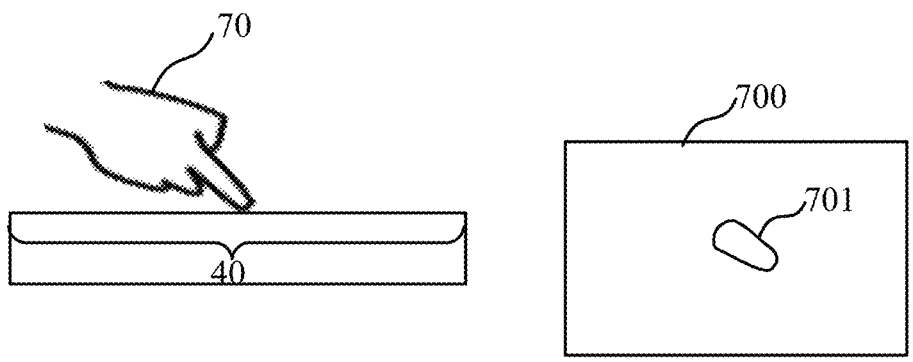
FIGS. 4A to 4D are schematic diagrams respectively illustrating a first application example of a display apparatus according to an embodiment of the present application.
Figure 4B:
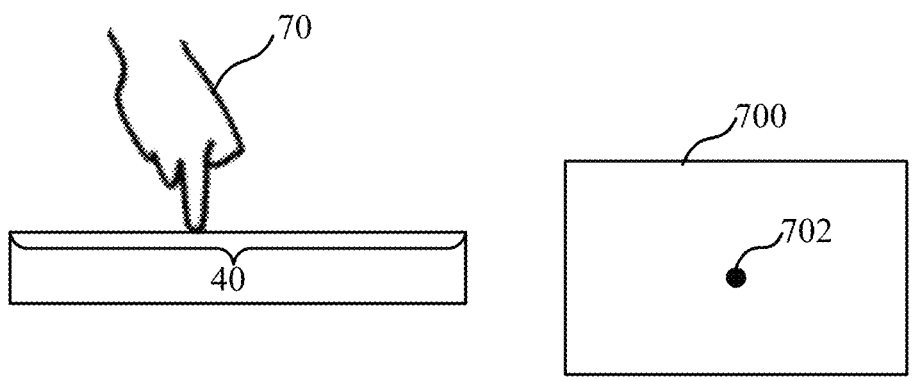

FIGS. 4A and 4B are a case where the identified image is a single image. As shown in FIG. 4A, the image 700 acquired by the image acquiring component 30 contains a shaded area 701 corresponding to the operating body 70 (i.e., the user's finger). In the case shown in FIG. 4A, the operating body 70 obliquely contacts a predetermined area (i.e., exit/incidence area 40) in the waveguide unit 22, then the first control instruction is generated based on an end position of the shaded area 701 acquired by the image acquiring component 30. As shown in FIG. 4B, the image 700 acquired by the image acquiring component 30 contains a shaded point 702 corresponding to the operating body 70 (i.e., the user's finger). In the case shown in FIG. 4B, the operating body 70 vertically contacts a predetermined area (i.e., exit/incidence area 40) in the waveguide unit 22, then the first control instruction is generated based on position of the shaded point 702 acquired by the image acquiring component 30.

In other words, the end position of the shaded area 701 or the position of the shaded point 702 correspond to the predetermined position in the exit/incidence area 40 in the waveguide unit 22, this predetermined position is preset as corresponding to a predetermined instruction to control the display apparatus, such as the instruction to display a next image/video, the instruction to increase/decrease lightness, the instruction to switch a resolution, and so on. The predetermined instruction to control the display apparatus is generated based on the single image acquired by the image acquiring component 30.

Figure 4C:
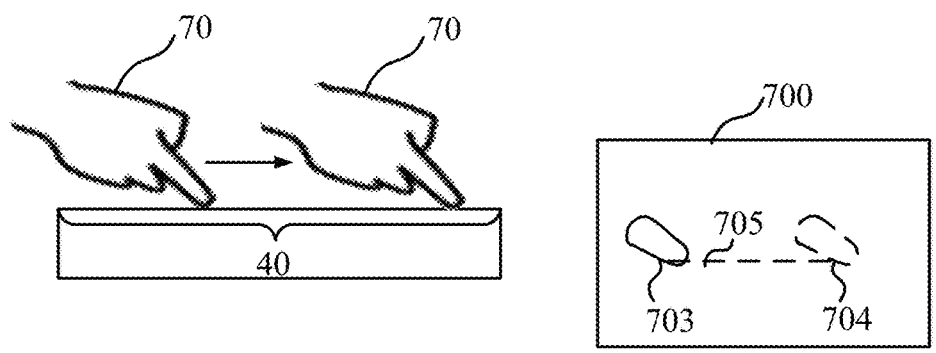
Figure 4D:
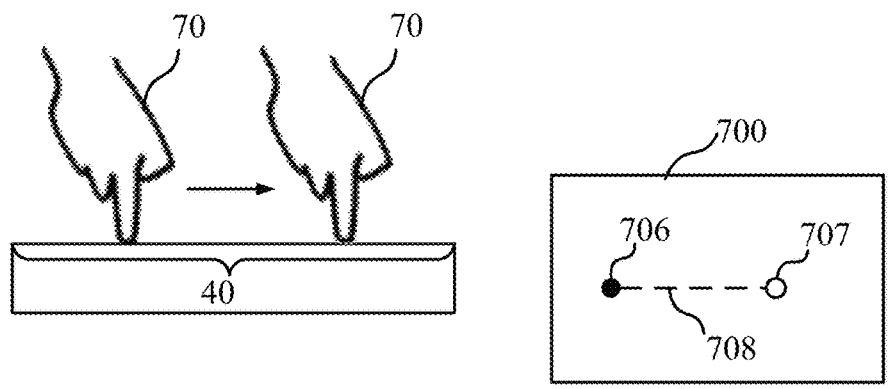

FIGS. 4C and 4D are a case where the identified image is a plurality of images. As shown in FIG. 4C, the image 700 acquired by the image acquiring component 30 contains a plurality of shaded areas 703 and 704 corresponding to the operating body 70 (i.e., the user's finger). In the case shown in FIG. 4C, the operating body 70 obliquely contacts a predetermined area (i.e., exit/incidence area 40) in the waveguide unit 22 and moves on the specific area, then the first control instruction is generated based on a movement track 705 of an end position of the shaded areas 703 and 704 acquired by the image acquiring component 30. As shown in FIG. 4D, the image 700 acquired by the image acquiring component 30 contains a plurality of shaded points 706 and 707 corresponding to the operating body 70 (i.e., the user's finger). In the case shown in FIG. 4D, the operating body 70 vertically contacts a predetermined area (i.e., exit/incidence area 40) in the waveguide unit 22 and moves on the specific area, then the first control instruction is generated based on a movement track 708 of the shaded points 706 and 707 acquired by the image acquiring component 30.

In other words, the movement track of the end position of the shaded areas 701 and 704 or the movement track of the position of the shaded points 706 and 707 correspond to the track at the predetermined position in the exit/incidence area 40 in the waveguide unit 22, this predetermined position track is preset as corresponding to a particular instruction to control the display apparatus, such as the instruction to display a next image/video, the instruction to increase/decrease lightness, the instruction to switch a resolution, and so on. The particular instruction to control the display apparatus is generated Based on the plurality of images acquired by the image acquiring component 30.

Figure 5A:
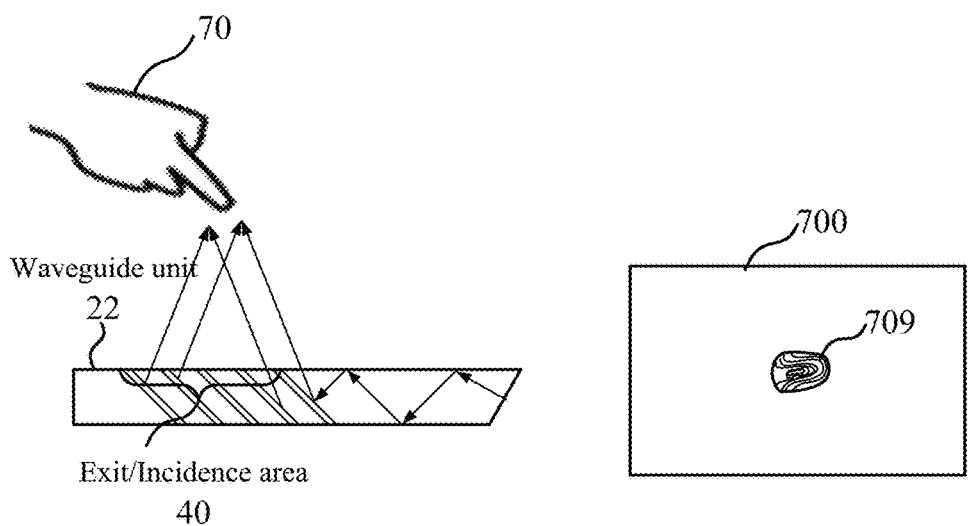
FIGS. 5A and 5B are schematic diagrams respectively illustrating a second application example of a display apparatus according to an embodiment of the present application.
Figure 5B:
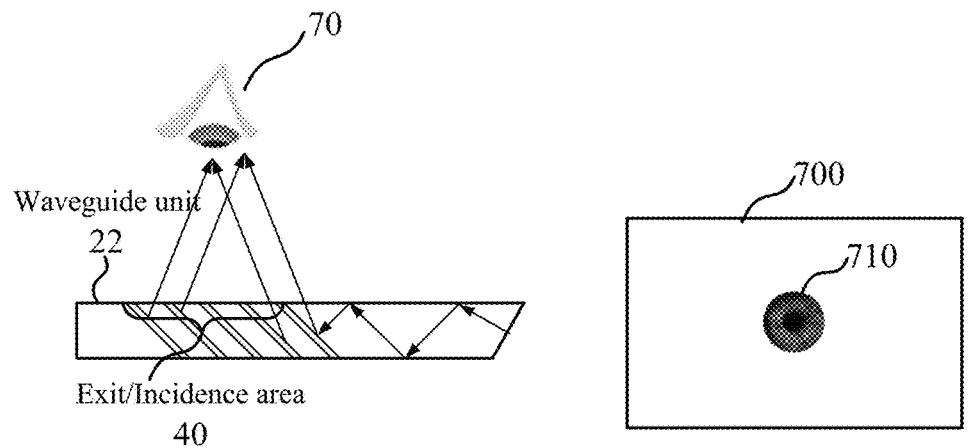

FIGS. 5A and 5B are schematic diagrams respectively illustrating a second application example of a display apparatus according to an embodiment of the present application. In the case shown in FIGS. 5A and 5B, the display apparatus is in the first operating state of concurrently executing display of the first image and acquisition of the second image, when an object contacts the predetermined area (i.e., exit/incidence area 40), a surface that faces the predetermined area of object is irradiated by the displaying light.

As shown in FIG. 5A, the object is the user's finger, a surface that faces the predetermined area of the user's finger is irradiated by the displaying light exited from the exit/incidence area 40. After the displaying light irradiates the user's finger, it is reflected by the user's finger, as the photographing light that enters via at least part of the waveguide unit 22, the image corresponding to the user's finger is acquired by the image acquiring component 30, in the case as shown in FIG. 5A, the image 709 of the user's finger acquired by the image acquiring component 30 is a fingerprint image of the user's finger.

It needs to be noted that, FIG. 5A is merely schematic, in the case where the image acquiring component 30 acquires the image 709 corresponding to the user's finger, the user's finger needs to contact the exit/incidence area 40, and irradiation on the user's finger is executed by only the displaying light, without the participation of outside light. In this way, even if in dark, acquisition and identification of the image 709 of the user's finger can be achieved.

In addition, in an application example, the display apparatus according to the embodiment of the present application and the electronic device configured with the display apparatus are in the first operating state of concurrently executing display of the first image and acquisition of the second image, thus while executing display of the first image, it is possible to irradiate the user's finger with the displaying light that forms the first image, to acquire the image 709 corresponding to the user's finger. In another application example, the display apparatus according to the embodiment of the present application and the electronic device configured with the display apparatus are in the third operating state of executing acquisition of the second image, in other words, the display apparatus according to the embodiment of the present application and the electronic device configured with the display apparatus are in a black-screen lock state, a light source unit (which will be described in detail below) in the display component 10 can be enabled when detecting the contact of the user's finger, to irradiate displaying light to illuminate the user's finger and thereby obtain the image 709 corresponding to the user's finger, to perform an operation like unlocking based on the image 709. In another application example, there is no need to execute display of a specific image or video.

As shown in FIG. 5B, the object is the user's eyes, the surface that faces the predetermined area of the user's eyes when viewing are irradiated by the displaying light exited from the exit/incidence area 40. After the displaying light irradiates the user' eyes, it is reflected by the user's eyes, as the photographing light that enters via at least part of the waveguide unit 22, the image corresponding to the user's eyes is acquired by the image acquiring component 30. In the case shown in FIG. 5B, the image 710 corresponding to the user's eyes as acquired by the image acquiring component 30 is an iris image of the user's eyes. In the application example as shown in FIG. 5B, the iris image of the user's eyes is acquired while the user is viewing, the user does not need to input a key or execute other authentication measures, which improves using convenience of the user.

In other words, while the display apparatus executes display of the first image, the image acquiring component acquires biometric information of the user that is viewing the first image (such as, fingerprint image, iris image). It is determined whether the user has the authority of viewing display of the first image or executing control over the display apparatus based on the aforesaid acquired biometric information.

Figure 6:
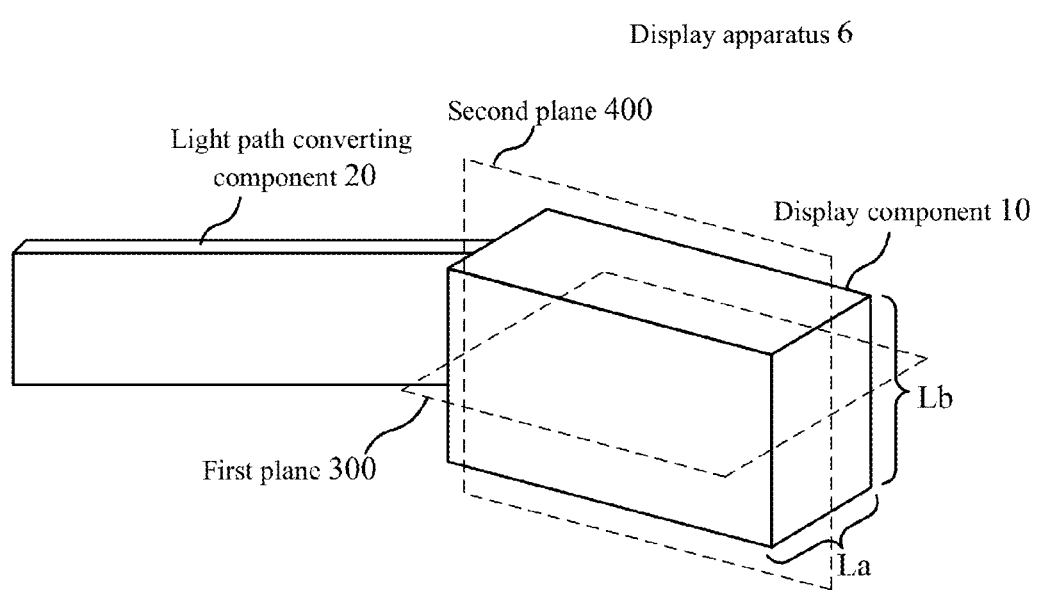
FIG. 6 is a structural block diagram illustrating a display apparatus according to a fourth exemplary embodiment of the present application.

FIG. 6 is a structural block diagram illustrating a display apparatus according to an eleventh embodiment of present application. For simplicity of the illustration, FIG. 6 only illustrates the display apparatus 6 that includes the display component 10 and the light path converting component 20, internal configurations of the display component 10 and the light path converting component 20 as well as the light path of the image acquiring component 30 are not shown in FIG. 6.

As illustrated in FIG. 6, light that forms the first image in the display component 10 is on a first plane 300, light that forms the virtual image corresponding to the first image and exits from the light path converting component 20 is on a second plane 400, there is a first angle between the first plane 300 and the second plane 400. In an embodiment of the present application, the first angle is 90 degrees. In this case, a first size La of the display component in a direction vertical to the first plane is made smaller than a second size Lb of the display component in a direction parallel to the first plane. Thus, when the display apparatus 6 is provided within a wearable electronic device, for example, when the electronic device is smart glasses, the display component 10 is provided within a frame at one side (i.e., glass leg) of the smart glasses, it is such configured so that thickness of the frame within which the display component 10 is provided is thinner. Similarly, when the electronic device is a smart watch, the display component 10 is provided within a wrist strap at one side of the smart watch, and it is such configured so that thickness of the wrist strap within which the display component 10 is provided is thinner. Accordingly, the display component 10 according to the fourth exemplary embodiment of the present application achieves a thickness reduction in a specific direction, and thereby achieves a thickness reduction in a specific direction of the display apparatus 6.

Figure 7A:
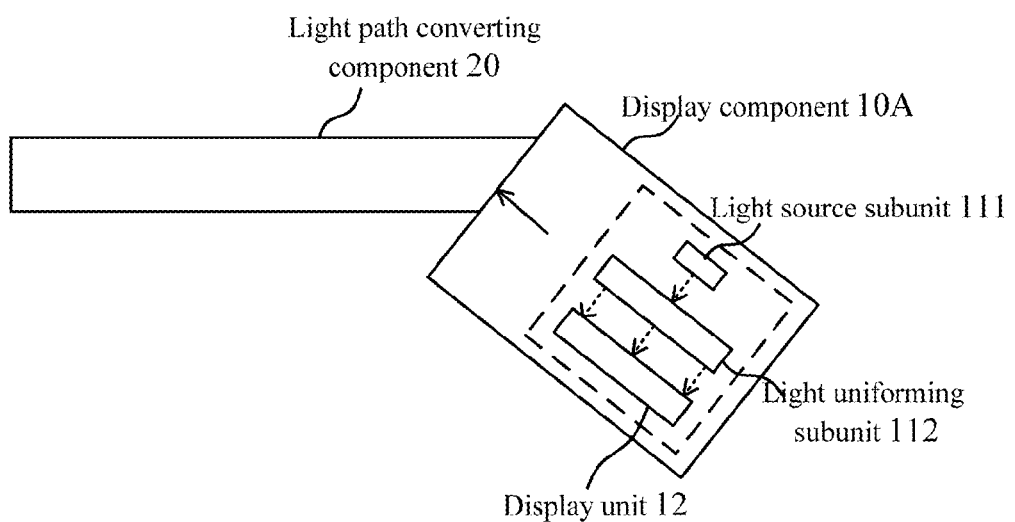
FIGS. 7A and 7B are structural block diagrams respectively illustrating a display apparatus according to a fifth exemplary embodiment of the present application.
Figure 7B:
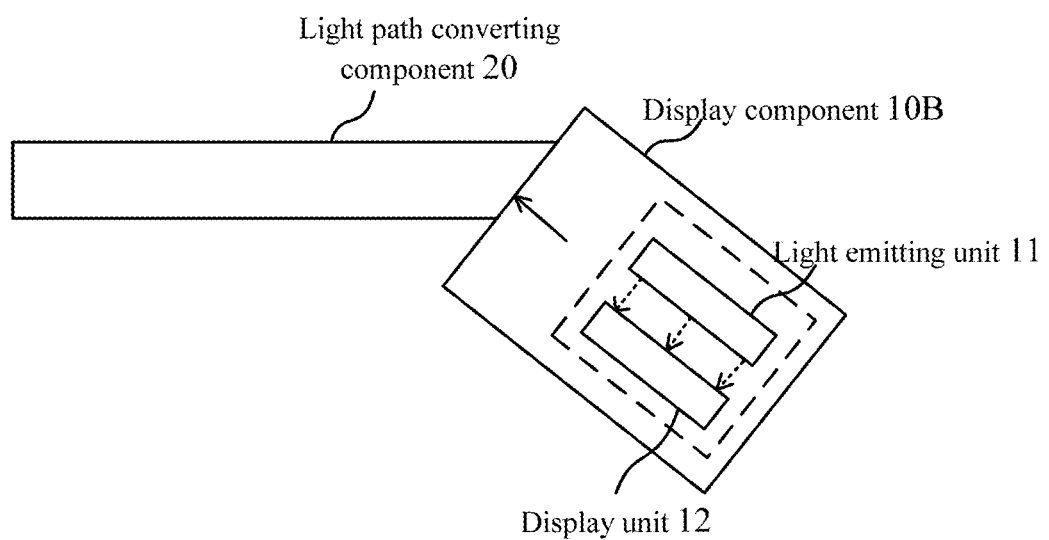

FIGS. 7A and 7B are structural block diagrams respectively illustrating a display apparatus according to a fifth exemplary embodiment of the present application. Similar to the display apparatus according to the fourth embodiment of the present application as shown in FIG. 6, the display apparatus 7 according to the fifth embodiment of the present application also includes a display component 10 and a light path converting component 20. As shown in FIG. 7A, the display component 10A specifically includes a light source subunit 111, a light uniforming subunit 112, and a display unit 12, wherein the light uniforming subunit 112 sets the light source subunit 111 overlapped in an emission direction of the initial light corresponding to the first image, and uniforms a point light source emitted by the light source subunit 111 as backlight. Different than that, as shown in FIG. 7B, in the display apparatus 7 according to the fifth embodiment of the present application, the display component 10B specifically includes a light emitting unit 11 and a display unit 12. The light emitting unit 11 is configured to generate and emit plane backlight (light indicated by the dotted-line arrow shown in FIG. 7B), which is on the first plane as described with reference to FIG. 6. The display unit 12 is provided within an irradiation area of the backlight, and configured to generate the initial light corresponding to the first image based on the first image (e.g. light indicated by the solid-line arrow shown in FIG. 7B).

Therefore, in the display apparatus according to the fifth embodiment of the present application as shown in FIG. 7B, a combination manner of a single point light source and an optical light uniforming system as shown in FIG. 7A is replaced with a single light emitting unit 11 that emits plane backlight, so that thickness of the display component 10 in the display apparatus according to the fifth exemplary embodiment of the present application is reduced in the emission direction of the initial light corresponding to the first image.

Figure 8:
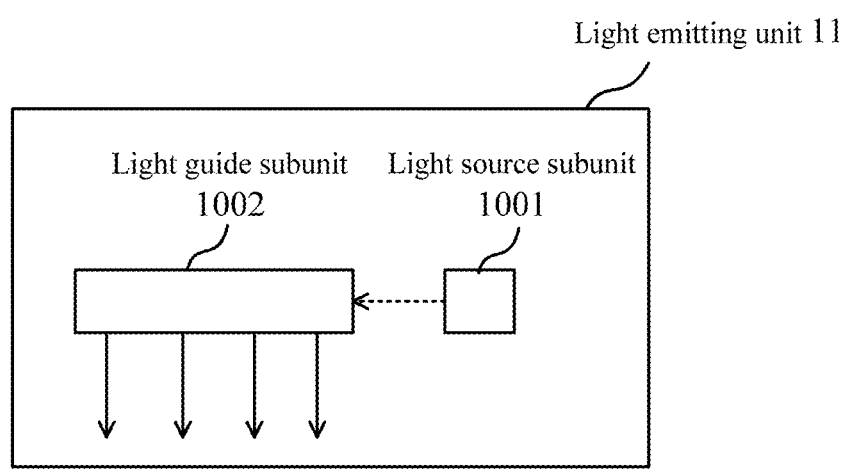
FIG. 8 is a structural block diagram illustrating a light emitting unit in a display apparatus according to a sixth exemplary embodiment of the present application.

FIG. 8 is a structural block diagram illustrating a light emitting unit in a display apparatus according to a sixth embodiment of the present application. The light emitting unit 11 as shown in FIG. 8 may be an implementation of the light emitting unit that emits plane backlight in the display apparatus according to the fifth embodiment of the present application as shown in FIG. 7B. The light emitting unit 11 in the display apparatus according to the sixth exemplary embodiment of the present application includes a light source unit 1001 and a light guide subunit 1002 in particular. Specifically, the light source subunit 101 is configured to emit light towards a second direction (light indicated by the dotted-line arrow shown in FIG. 8), the light guide subunit 1002 is provided within an irradiation area of the light, the light transmits through the light guide subunit 1002 to form the backlight (light indicated by the solid-line arrow shown in FIG. 8). That is, the light guide subunit 1002 converts light emitted by the light source subunit 101 which serves as a single point light source into plane backlight, which is located on the first plane described above with reference to FIG. 6. In an embodiment of the present application, the light source subunit 101 may be an LED light source, and the light emitting unit 11 may further include an optical film. Thickness of the whole light emitting unit 11 is controlled for example within 1.5 mm, and the emission angle of the plane backlight converted by the light guide subunit 1002 is controlled within 14 degrees, that is, an maximum angle between an exit direction of the backlight formed by the light guide subunit 1002 and the second direction is 7 degrees. Therefore, the exit direction of the plane backlight converted by the light guide subunit 1002 approximately can be considered as in the same direction (i.e., the second direction), which avoids the generation of stray light that exits towards a direction different than the second direction.

Therefore, in the light emitting unit 11 of the display apparatus according to the sixth embodiment of the present application, the light emission direction of the light source subunit 101 is different than the light emission direction of the light converted by the light guide subunit 1002 (i.e., in a direction vertical to the emission direction of the backlight, the light source subunit 101 is provided at a side of the light guide subunit 1002), so that in comparison with the case of providing the light source subunit and the light guide subunit overlapped in the emission direction of the backlight, thickness of the display component 10 in the display apparatus 8 according to the sixth embodiment of the present application is reduced in the emission direction of the initial light corresponding to the first image.

Figure 9:
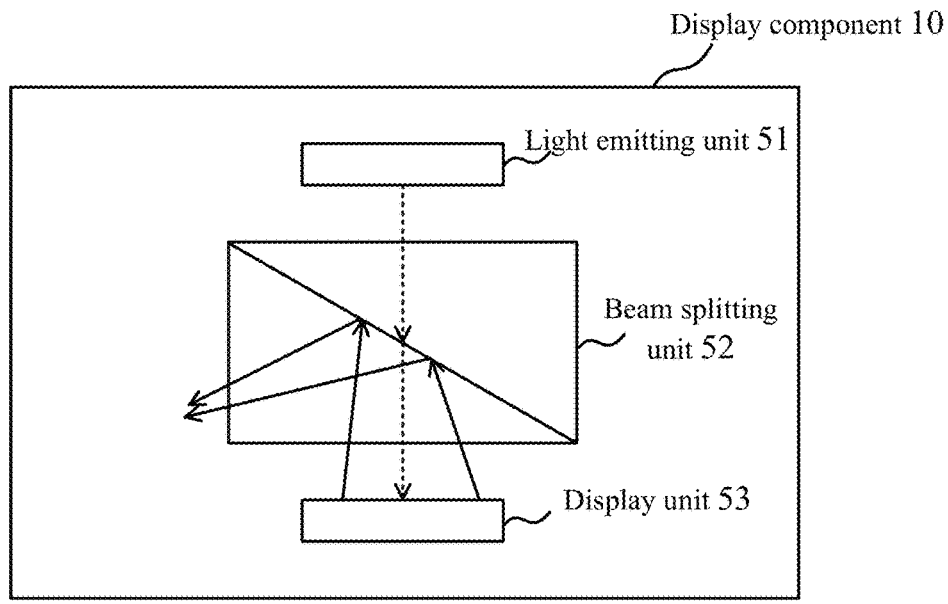
FIG. 9 is a structural block diagram illustrating a display component in a display apparatus according to a seventh exemplary embodiment of the present application.

FIG. 9 is a structural block diagram illustrating a display component in a display apparatus according to a seventh exemplary embodiment of the present application. As shown in FIG. 9, the display component 10 in the display apparatus according to the seventh exemplary embodiment of the present application includes a light emitting unit 51, a display unit 52, and a beam splitting unit 53. Specifically, the light emitting unit 51 is configured to emit backlight (light indicated by the dotted-line arrow shown in FIG. 9). As described above, the light emitting unit 51 may be a light emitting unit that emits plane backlight as described above with reference to FIGS. 7 and 8. The backlight from the light emitting unit 51 transmits through the beam splitting unit 53. In an embodiment of the present application, the beam splitting unit 53 is a polarization beam splitter (PBS). P-polarized backlight emitted by the light emitting unit 51 transmits through the PSB that serves as the beam splitting unit 53, to illuminate the display unit 52. The display unit 52 is provided within an irradiation area of the backlight, and configured to generate the initial light corresponding to the first image based on the first image (light indicated by the solid-line arrow shown in FIG. 9). Further, the initial light corresponding to the first image from the display unit 52 (after being modulated as S-polarized light) is reflected at the PBS which serves as the beam splitting unit 53, to be guided to the light path converting component via the beam splitting unit 53.

Figure 10:
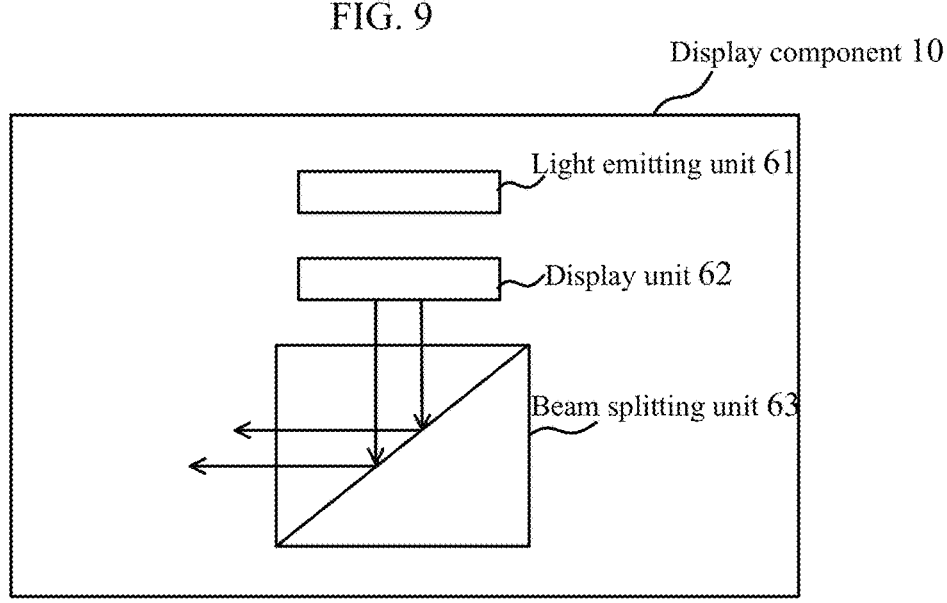
FIG. 10 is a structural block diagram illustrating a display component in a display apparatus according to an eighth exemplary embodiment of the present application.

FIG. 10 is a structural block diagram illustrating a display component in a display apparatus according to an eighth exemplary embodiment of the present application. As shown in FIG. 10, the display component 10 in the display apparatus according to the eighth exemplary embodiment of the present application includes a light emitting unit 61, a display unit 62, and a beam splitting unit 63. Specifically, the display unit 62 is configured to generate a display signal corresponding to the first image based on the first image. The light emitting unit 61 is configured to generate the initial light corresponding to the first image based on the display signal. That is, the light emitting unit 61 and the display unit 62 in the display apparatus according to the eighth exemplary embodiment of the present application may be implemented as a self-luminous type OLED display apparatus, the display unit 62 is a control unit that generates a display drive signal based on the first image to be displayed, the light emitting unit 61 is a self-luminous layer that executes emitting display based on the received display drive signal. Similar to the case described with reference to FIG. 9, the beam splitting unit 63 is configured to guide the initial light corresponding to the first image from the display unit to the light path converting component. In an embodiment of the present application, the beam splitting unit 63 is a polarization beam splitter (PBS).

Therefore, in the display component 10 of the display apparatus according to the eighth exemplary embodiment of the present application, the display unit and the light emitting unit are integrally provided on one side of the beam splitting unit, so that a size of the display apparatus in the direction of generating the initial light is smaller than a size of display apparatus in the direction of generating the initial light in the case where the display unit and the light emitting unit are integrally provided on both sides of the beam splitting unit (the case shown with reference to FIG. 9).

Figure 11:
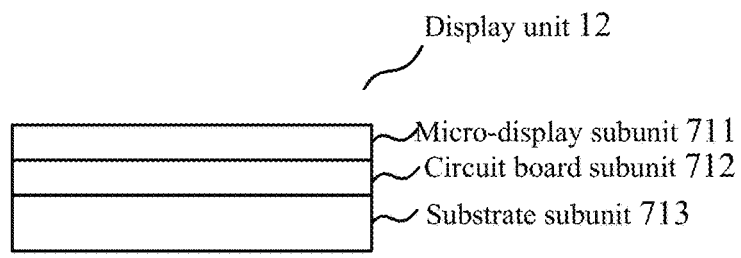
FIG. 11 is a structural block diagram illustrating a display unit in a display apparatus according to a ninth exemplary embodiment of the present application.

FIG. 11 is a structural block diagram illustrating a display unit in a display apparatus according to a ninth exemplary embodiment of the present application. The display unit 12 shown in FIG. 11 may be applied to the display component described with reference to FIGS. 7 to 9. As shown in FIG. 11, the display unit 12 includes a micro-display subunit 711, a circuit board subunit 712, and a substrate subunit 713. Specifically, the micro-display subunit 711 is configured with an array of a plurality of pixel cells, each pixel cell being used for generating the initial light corresponding to the first image. The circuit board subunit 712 is configured to provide a control signal based on the first image to control the pixel cells in the micro-display subunit 711 to generate the initial light corresponding to the first image. The substrate subunit 713 is configured to arrange the micro-display subunit 711 and the circuit board subunit 712 thereon.

Flexural strength and fracture toughness of the substrate subunit 713 may be denoted by the following equations:

$$\sigma_f = \sqrt{\frac{2E\gamma_f}{C}} \quad \text{(Equation 1)}$$

$$K_{ZC} = \sqrt{2Z\gamma_f} \quad \text{(Equation 2)}$$

where $\sigma_f$ is flexural strength, $K_{ZC}$ is fracture toughness, E is elastic modulus, $\gamma_f$ is fracture energy, and C is crack size. As can be seen from the above Equations 1 and 2, in order to improve strength of the material, fracture energy and elastic modulus must be increased, to reduce fracture size. To achieve toughness of the material, fracture energy and elastic modulus must be increased. It is known that, the substrate subunit is typically made from metal material like aluminum, which always reaches a thickness of 1.6 mm. Elastic modulus of the non-metallic material, like ceramic material, is much larger than that of the metals, often higher by one to several times.

Thus, in the display unit of the display apparatus according to the ninth exemplary embodiment of the present application, the substrate subunit 713 is made from non-metallic material that satisfies a predetermined intension, so that thickness of the substrate subunit is lower than that of the substrate subunit 713 made from metallic material that satisfies a predetermined intension (e.g., as low as 0.25 mm).

Figure 12A:
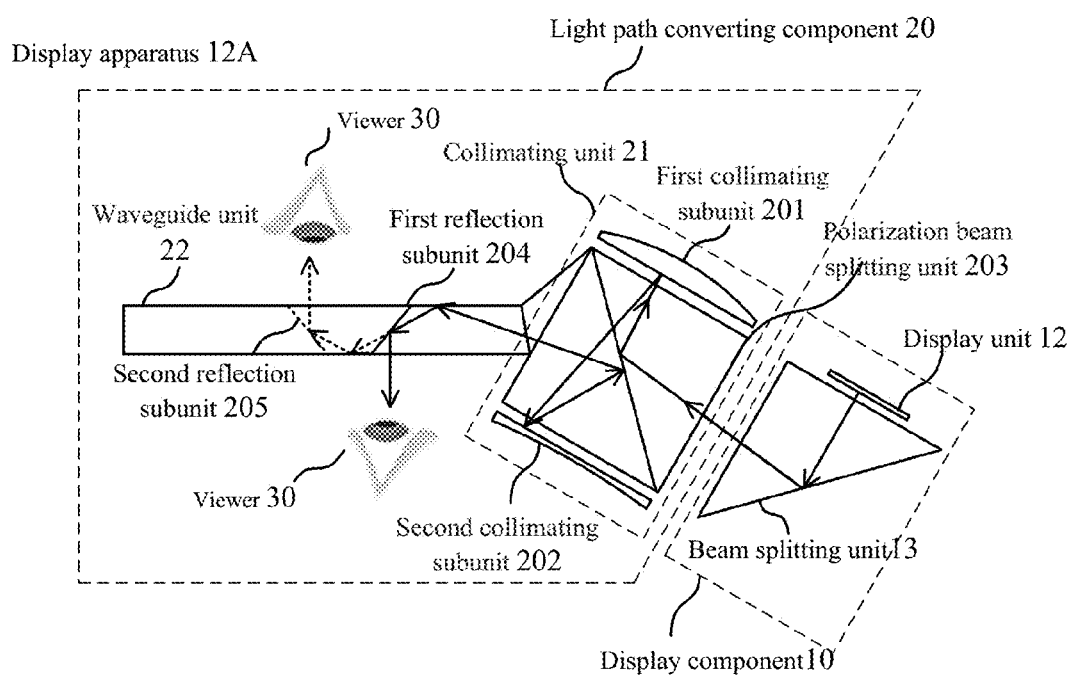
FIGS. 12A and 12B are structural block diagrams respectively illustrating a display apparatus according to a tenth exemplary embodiment of the present application.
Figure 12B:
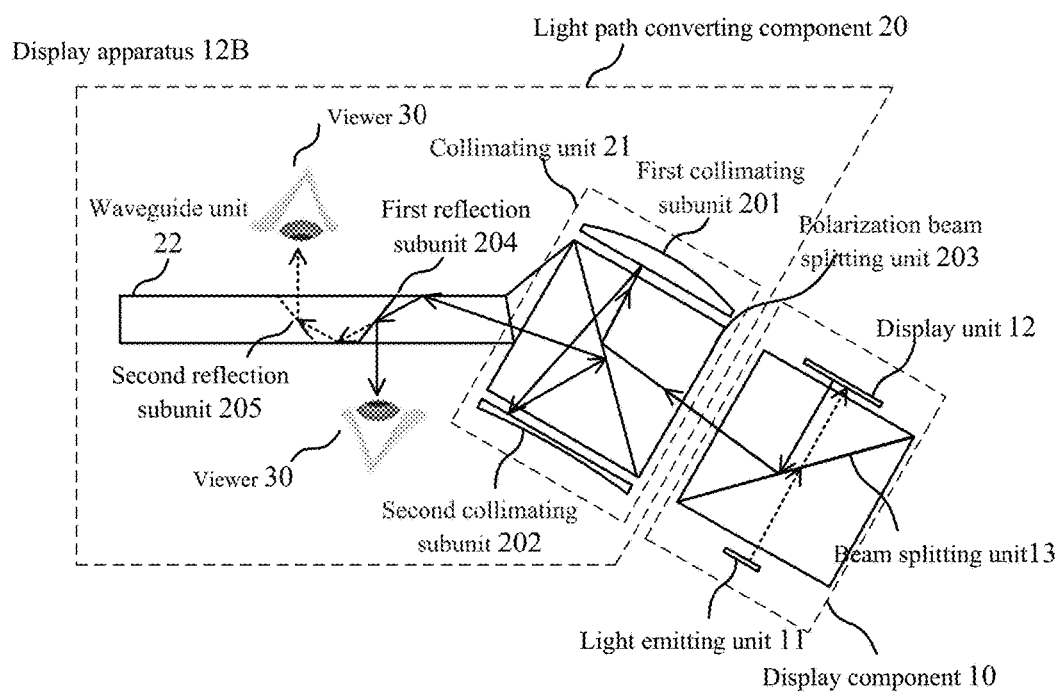

FIGS. 12A and 12B are structural block diagrams respectively illustrating a display apparatus according to a tenth exemplary embodiment of the present application. Similar to the display apparatus described with reference to FIG. 1, the display apparatus according to the tenth exemplary embodiment of the present application as shown in FIGS. 12A and 12B also includes a display component 10 and a light path converting component 20.

Specifically, the display component 10 includes a display unit 12 and a beam splitting unit 13 (as shown in FIG. 12A), this type of display component has already been described above with reference to FIG. 10. Alternatively, the display component 10 includes a light emitting unit 11, a display unit 12, and a beam splitting unit 13 (as shown in FIG. 12B), this type of display component has already been described above with reference to FIG. 9. Here, repeated descriptions of the display component 10 and its light path will be omitted.

As shown in FIGS. 12A and 12B, the light path converting component 20 further includes a collimating unit 21 and a waveguide unit 22, the collimating unit 21 is configured to collimate the initial light corresponding to the first image from the display component 10 into collimated light corresponding to the first image, and lead the same into the waveguide unit. Specifically, the collimating unit 21 includes a first collimating subunit 201 and a second collimating subunit 202 provided opposite to each other, and a polarization beam splitting subunit 203 provided between the first collimating subunit 201 and the second collimating subunit 202, the initial light corresponding to the first image from the display component 10 is reflected by the polarization beam splitting subunit 203 to the first collimating subunit 201, thereafter it is collimated by the first collimating subunit 201 and the second collimating subunit 202, and exited by the polarization beam splitting unit 203 as the collimated light corresponding to the first image. The waveguide unit 22 guides the collimated light from the collimating unit 21 to the predetermined position, wherein the collimated light corresponding to the first image is for forming the virtual image corresponding to the first image. In an embodiment of the present application, the first collimating subunit 201 and the second collimating subunit 202 may be a single lens or a lens group as needed by design. It is possible to implement adjustment of a size of the virtual image corresponding to the first image by adjusting the relative position of the lens or lens group by which the first collimating subunit 201 and the second collimating subunit 202 are configured.

In addition, as shown in FIGS. 12A and 12B, the waveguide unit 22 further includes a first reflection subunit 204 and/or a second reflection subunit 205, it is possible to control to guide the collimated light from the collimating unit 21 and corresponding to the first image to the predetermined position to exit, by setting the position and angle of the first reflection subunit 204 and/or the second reflection subunit 205. In a first case, the collimating unit 21 and the display component 10 are located at a first side relative to the plane on which the waveguide unit 22 is located, when the first reflection subunit 204 as shown in FIGS. 12A and 12B is provided, it is possible to exit towards the first side. In a second case, when the second reflection subunit 205 as shown in FIGS. 12A and 12B is provided, the collimated light corresponding to the first image may exit towards a second side relative to the plane on which the waveguide unit 22 is located, the first side and the second side are opposite sides relative to the plane on which the waveguide unit is located. Specifically, when the display apparatus is applied to for example a head-mounted electronic device, it is possible to adopt the configuration example in the first case, the collimated light corresponding to the first image is made to exit towards the first side, that is, the collimated light is made to exit towards the eyes of a user wearing the head-mounted electronic device. When the display apparatus is applied to for example a wrist-mounted electronic device, it is possible to adopt the configuration example in the second case, the collimated light corresponding to the first image is made to exit towards the second side, that is, the collimated light is made to exit towards the eyes of a user wearing and viewing the wrist-mounted electronic device. In addition, it will be further explained below in detail that the exit direction of the display apparatus can be set as required by viewing, for example, rotation of the first reflection subunit 204 and/or the second reflection subunit 205 may be controlled, to control the exit direction of the first reflection subunit 204 and/or the second reflection subunit 205, thus achieving a switch of bi-directional display of the display apparatus.

Therefore, in the display apparatus according to the tenth exemplary embodiment of the present application, in the collimating unit 21, a folded imaging light path between the first collimating subunit 201 and the second collimating subunit 202 is implemented by using the polarization beam splitter 203, thereby an overall size of the display apparatus is reduced.

FIGS. 13A to 13E are structural block diagrams illustrating an electronic device according to an embodiment of the present application. As shown in FIGS. 13A to 13E, the electronic device 100 according to an embodiment of the present application comprises a body apparatus 101 and a fixing apparatus 102 connected with the body apparatus 101. The body apparatus 101 includes a processing component 104 configured to generate a first image to be displayed and execute display control. The electronic device 100 according to an embodiment of the present application further comprises a display apparatus 103, which is the display apparatus described above with reference to FIGS. 1 to 12B. The display apparatus 103 is provided within the body apparatus 101 and/or the fixing apparatus 102. In FIGS. 13A to 13E, configuration of the display apparatus 103 will not be specifically shown.

The fixing apparatus 102 and the body apparatus 101 are connected. The fixing apparatus 102 includes at least a fixed state in which the fixing apparatus 102 can serve as at least a portion of an annular space or an approximate annular space that satisfies a first predetermined condition, the annular space or the approximate annular space can surround periphery of a columnar body that satisfies a second predetermined condition.

Figure 13A:
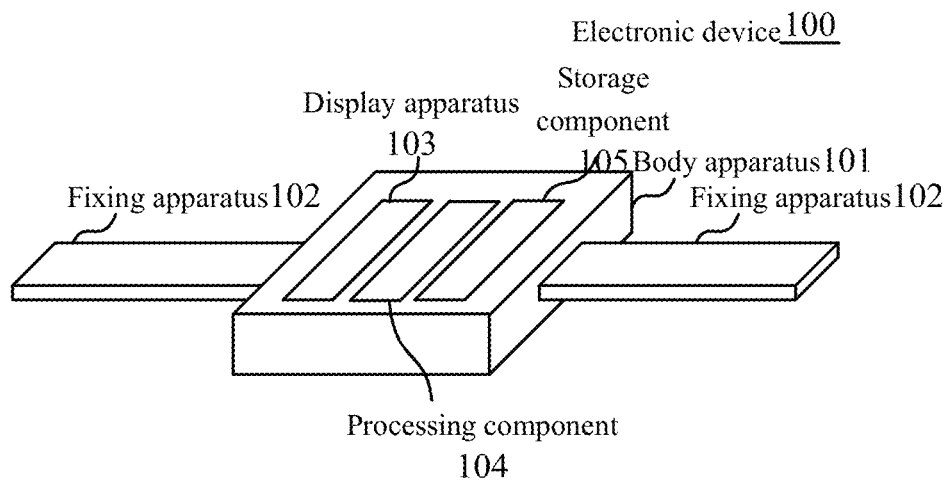
FIGS. 13A to 13E are structural block diagrams illustrating an electronic device according to an embodiment of the present application.
Figure 13B:
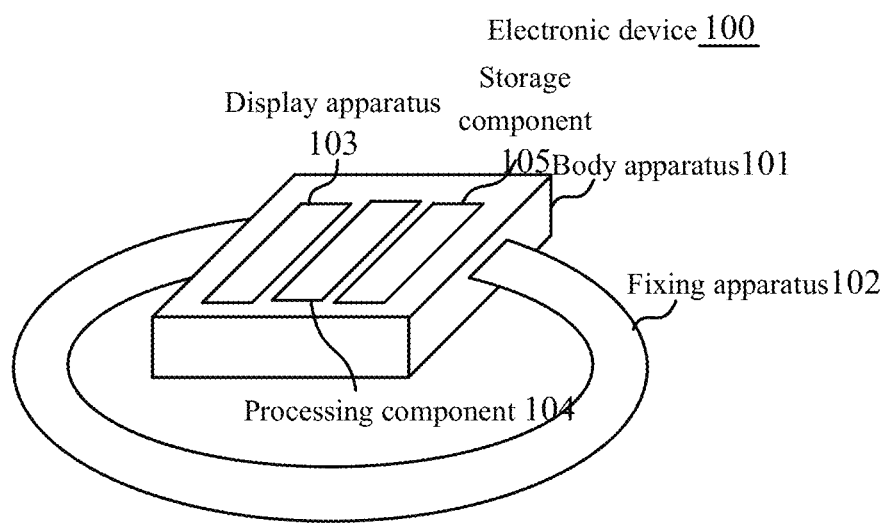
Figure 13C:
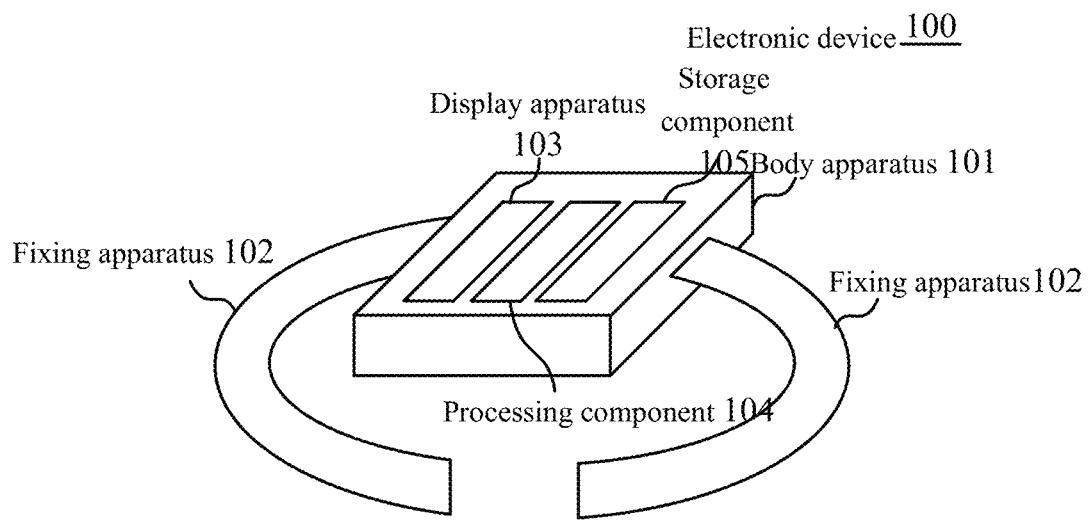

Specifically, FIGS. 13B and 13C respectively illustrate two fixed states that the fixing apparatus 102 is connected with the body apparatus 101. In a first fixed state as shown in FIG. 13B, the fixing apparatus 102 and the body apparatus 101 form a closed annular space, wherein the fixing apparatus 102 and the body apparatus 101 constitute a portion of the annular space, respectively. In a second fixed state as shown in FIG. 13C, the fixing apparatus 102 and the body apparatus 101 form an approximate annular space with a small opening, wherein the fixing apparatus 102 and the body apparatus 101 constitute a portion of the approximate annular space, respectively. In an embodiment of the present application, the body apparatus 101 is a dial portion of a smart watch, and the fixing apparatus 102 is a strap portion of the smart watch. The annular space or the approximate annular space formed by the fixing apparatus 102 and the body apparatus 101 can surround the wrist of the user of the smart watch which serves as the columnar body, and a diameter of the annular space or the approximate annular space is greater than a diameter of the user's wrist and smaller than a diameter of the user's fist.

Figure 13D:
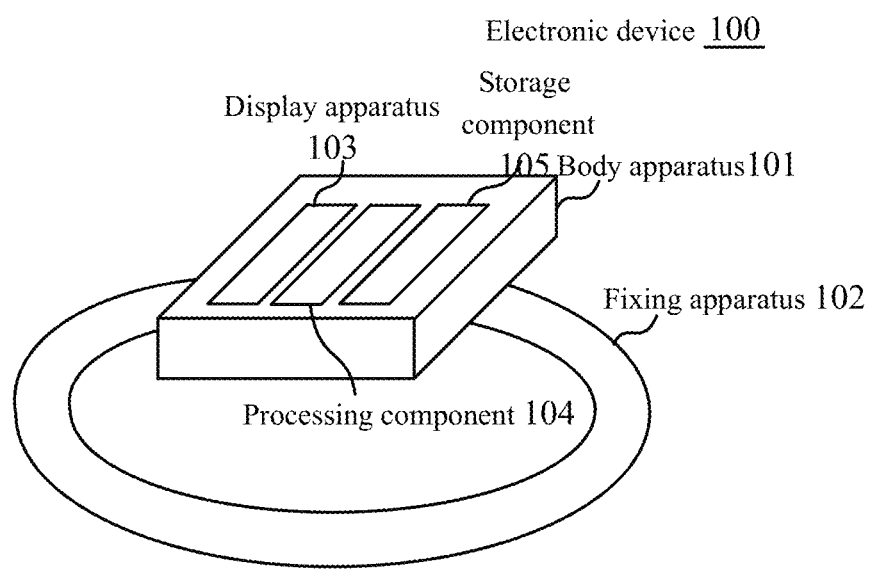
Figure 13E:
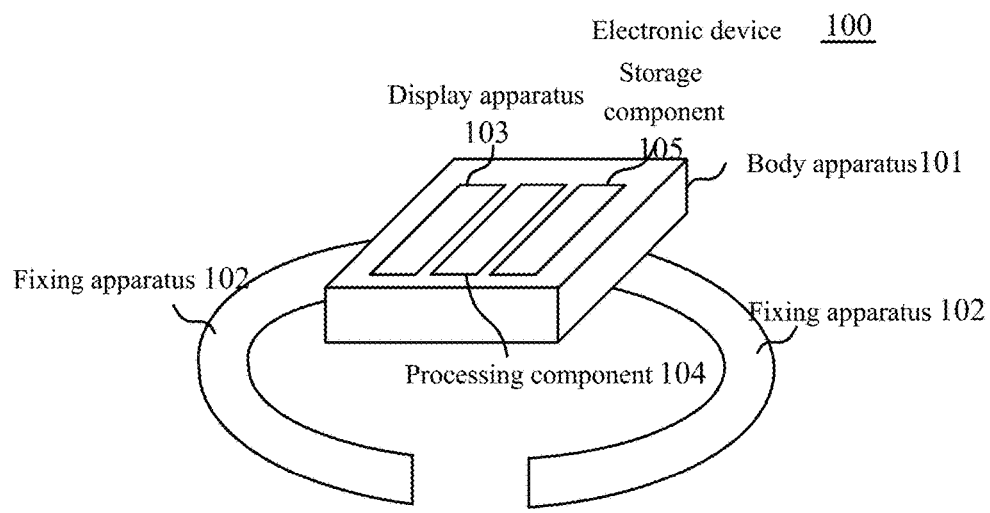

Further, of course, the annular space or the approximate annular space may be formed by the fixing apparatus 102 alone. As shown in FIGS. 13D and 13E, the body apparatus 101 may be provided on the fixing apparatus 102 (i.e., the body apparatus 101 is attached to the fixing apparatus 102 in the manner of surface contact), so that the fixing apparatus 102 alone forms the annular space (FIG. 13D) or the approximate annular space (FIG. 13E) that surrounds the columnar body. The fixing apparatus 102 is arranged with a fixing mechanism like hasps, snaps, zippers and so on (not shown).

Further, as shown in FIGS. 13A to 13E, the display apparatus 103 is arranged on the body apparatus 101. However, as will be readily appreciated by those skilled in the art, the present application is not limited thereto, the display apparatus 103 may also be arranged on the fixing apparatus 102, or arranged across the body apparatus 101 and the fixing apparatus 102. The display apparatus 103 is the display apparatus according to the embodiments of the present application described above with reference to FIGS. 1 to 9. That is, the display apparatus 103 includes a display component configured to output displaying light corresponding to a first image, and a light path converting component configured to perform light path conversion on the displaying light. The light path converting component unit comprises a collimating unit and a waveguide unit, and the collimating unit is configured to collimate the displaying light into collimated light, and lead the collimated light into the waveguide unit; the collimated light corresponding to the first image from the collimating unit is exited via the waveguide unit to form a virtual image corresponding to the first image at a predetermined position, a size of the virtual image being greater than a display size of the display component. The display apparatus 103 further comprises an image acquiring component configured to receive photographing light from external side of the display apparatus via at least part of the waveguide unit, to obtain a second image corresponding to the photographing light.

Further, as shown in FIGS. 13A to 13E, the electronic device 100 further comprises a storage component 105 configured to store the second image corresponding to the photographing light as acquired by the image acquiring component.

As shown above with reference to FIGS. 4A to 5B, the processing component 104 identifies image acquired by the image acquiring component, and generates a first control command based on the identified image to control the display component. Alternatively, while the display apparatus 100 executes display of the first image, the image acquiring component acquires biometric information of the user that is viewing the first image (such as, fingerprint image, iris image). The processing component 104 determines whether the user has the authority of viewing display of the first image or executing control over the display apparatus based on the aforesaid acquired biometric information.

Figure 14:
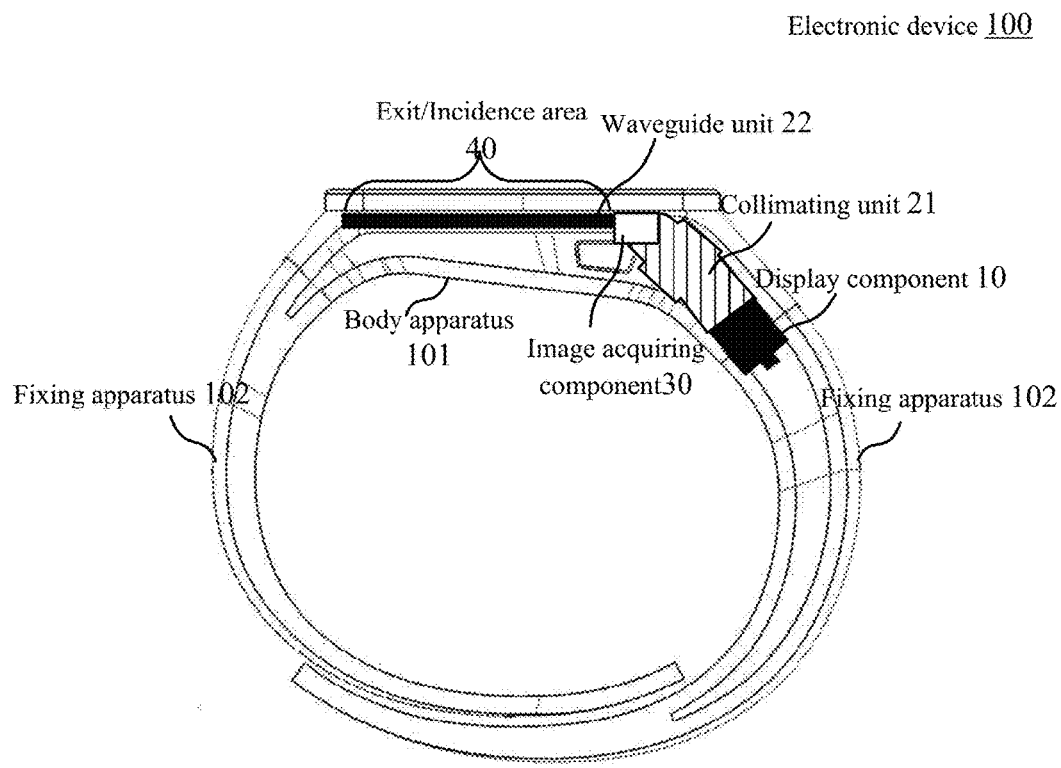
FIG. 14 is a schematic diagram illustrating a display apparatus according to an embodiment of the present application is applied to an electronic device.

FIG. 14 is a schematic diagram illustrating a display apparatus according to an embodiment of the present application is applied to an electronic device. As shown in FIG. 14, the display apparatus arranged in the electronic device 100 specifically includes: the display component 10, the collimating unit 21, the waveguide unit 22, and the image acquiring component 30. Detailed descriptions of individual units are omitted here for simplification. In addition, the electronic device 100 comprises the exit/incidence area 40, the displaying light is exited from the exit/incidence area 40 of the waveguide unit 22, and the photographing light enters from the exit/incidence area 40. In the electronic device 100 as shown in FIG. 14, the image acquiring component 30 is provided between the waveguide unit 22 and the collimating unit 21, which corresponds to the case as shown in FIG. 1A. Of course, configuration of the display apparatus according to the embodiment of the present application is not limited thereto, the image acquiring component 30 may be provided between the collimating unit 21 and the display component 10 or after the display component 10. In addition, the light path selecting component 50 and/or the light path switching component 60 may be arranged as needed. In this case, the image acquiring component 30 may be provided at a position as required by the electronic device according to needs, as long as it is on the light path of the photographing light controlled by the light path selecting component 50 and/or the light path switching component 60.

Figure 15:
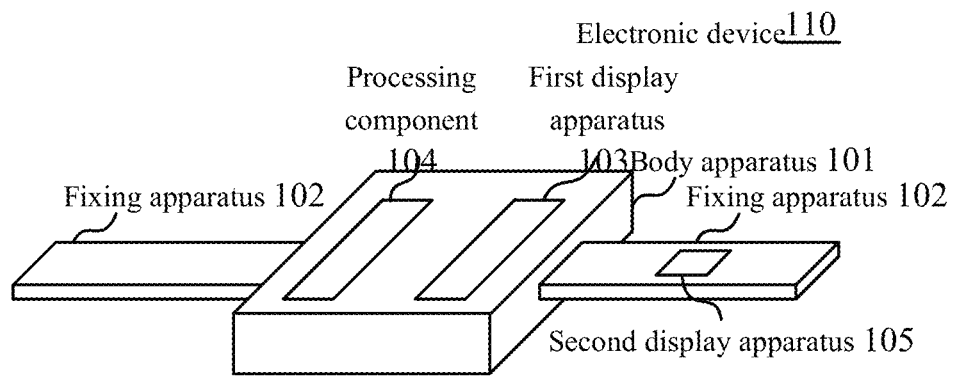
FIG. 15 is another structural block diagram illustrating an electronic device according to an embodiment of the present application.

FIG. 15 is another structural block diagram illustrating an electronic device according to an embodiment of the present application. Compared with the electronic device 100 according to the embodiment of the present application as described above with reference to FIGS. 13A to 13E, the electronic device 110 according to the second embodiment of the present application as shown in FIG. 12 further comprises a second display apparatus 105. The second display apparatus 105 is a display apparatus whose type is different than that of the first display apparatus 103. For example, the second display apparatus 105 includes, but not limited to, a liquid crystal display apparatus, an organic electroluminescent display apparatus, an organic light emitting diode display apparatus, an E Ink type display apparatus or the like.

One of the first display apparatus 103 and the second display apparatus 105 is provided on the body apparatus 101, and the other is provided on the fixing apparatus 102. As shown in FIG. 15, the first display apparatus 103 is provided on the body apparatus 101 and the second display apparatus 105 is provided on the fixing apparatus 102. Of course, the second display apparatus 105 may be provided on the body apparatus 101, and the first display apparatus 103 is provided on the fixing apparatus 102. Similar to the first display apparatus 103, a display direction of the second display apparatus 105 is the outward direction of the annular space or the approximate annular space. Typically, the second display apparatus 105 is for displaying content that needs not be amplified to display like time indication.

Moreover, not limited to the case shown in FIG. 15, the first display apparatus 103 and the second display apparatus 105 may be simultaneously provided on the body apparatus 101 or the fixing apparatus 102. For example, the first display apparatus 103 and the second display apparatus 105 are provided on the body apparatus 101 side by side. Alternatively, the first display apparatus 103 and the second display apparatus 105 are provided at two opposite positions through the radial direction of the fixing apparatus 102.

Figure 16:
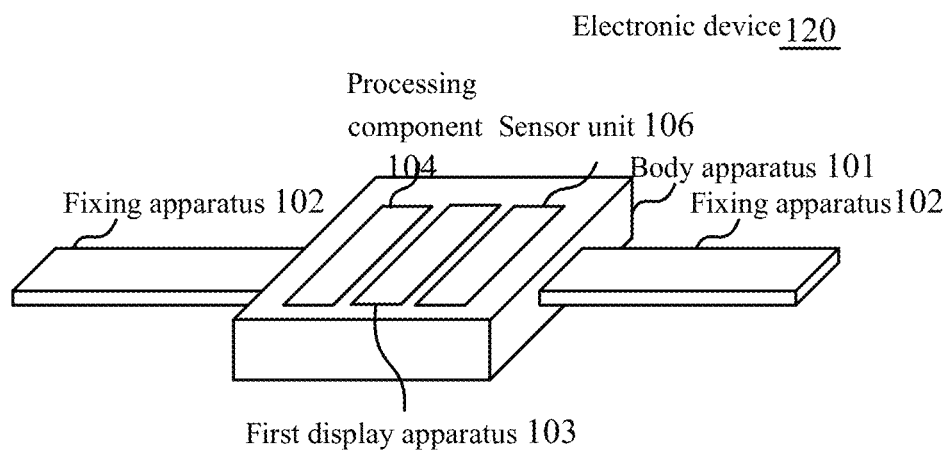
FIG. 16 is another structural block diagram illustrating an electronic device according to an embodiment of the present application.

FIG. 16 is another structural block diagram illustrating an electronic device according to an embodiment of the present application. Compared with the electronic device 100 according to the embodiment of the present application as described above with reference to FIGS. 13A to 13E, the electronic device 120 according to an embodiment of the present application as shown in FIG. 16 further comprises a sensor unit 106. As shown in FIG. 16, the sensor unit 106 is provided on the body apparatus 101. However, the sensor unit 106 may be also provided on the fixing apparatus 102.

The sensor unit 106 is configured to generate a first control signal when sensing that a first predetermined condition is satisfied, the processing component 104 controls ON/OFF of the first display apparatus 103 based on the first control signal. In an embodiment of the present application, the sensor unit 106 is an acceleration sensor, the first predetermined condition is an acceleration component value in the gravity direction is greater than a predetermined value (i.e., from the using state that the user is viewing the first display apparatus 103 to putting away the electronic device 100), and the processing component 104 controls the first display apparatus 103 to close based on the first control signal. As will be readily appreciated by those skilled in the art, the sensor unit 106 according to an embodiment of the present application is not limited to the acceleration sensor, it may include other sensor units that can generate a control signal instead.

Figure 17A:
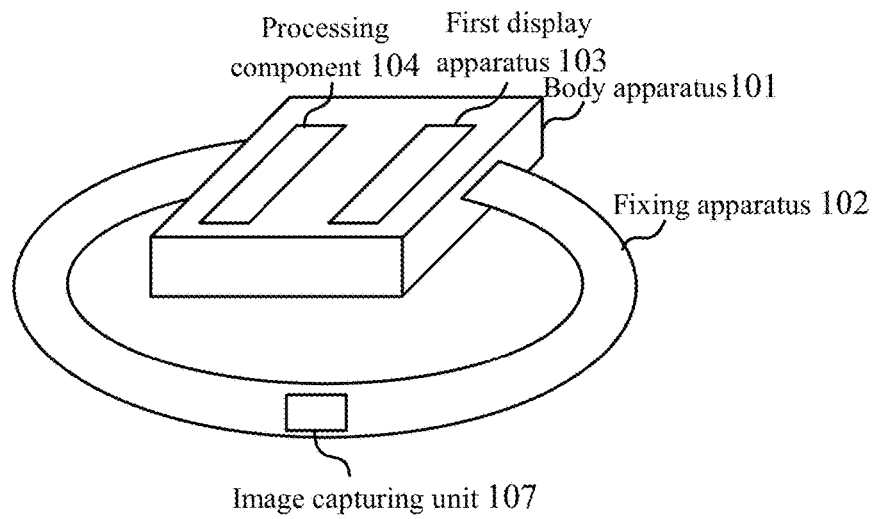
FIGS. 17A and 17B each are another structural block diagram illustrating an electronic device according to an embodiment of the present application.
Figure 17B:
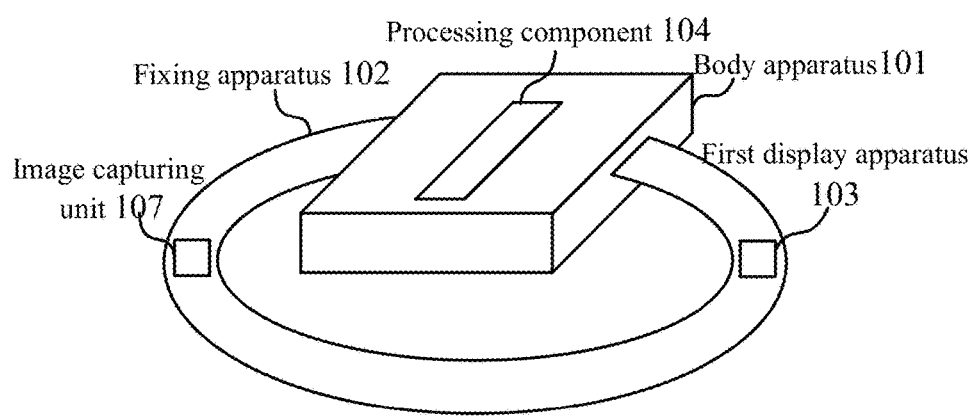

FIGS. 17A and 17B each are another structural block diagram illustrating an electronic device according to an embodiment of the present application. Compared with the electronic device 110 according to the embodiment of the present application as described above with reference to FIGS. 13A to 13E, the electronic device 130 according to an embodiment of the present application as shown in FIGS. 17A and 17B further comprises an image capturing unit 107. The image capturing unit 107 may be provided on the body apparatus 101 or the fixing apparatus 102. Specifically, FIG. 17A shows the case that the first display apparatus 103 is provided on the body apparatus 101 and the image capturing unit 107 is provided on the fixing apparatus 102. FIG. 17B shows the case that both the first display apparatus 103 and the image capturing unit 107 are provided on the fixing apparatus 102. No matter the case in FIG. 17A or FIG. 17B, an image capturing direction of the image capturing unit 107 and an image output direction of the first image display apparatus 104 are opposite in the radial direction of the annular space or the approximate annular space. Thus, when the realistic image captured by the image capturing unit 107 is displayed on the first display apparatus 103, since the capturing direction of the image capturing unit 107 is the same as the viewing direction of the user's eyes, so that the user can view the image that looks like transparently passing through the electronic device 140 via the first display apparatus 103.

In an embodiment of the present application, the image capturing unit 107 is configured to capture user interaction to generate a first image capturing signal, the processing component 104 converts the first image capturing signal into a second control signal to control the first display apparatus 103 to display a second image.

In another embodiment of the present application, the image capturing unit 107 is configured to capture a first sub-image in the image capturing direction, the processing component 104 generates a second sub-image. The second sub-image may be an identification image relative to the first sub-image obtained by analyzing the first sub-image, and may also be an identification image acquired based on for example a GPS sensor. Further, the second sub-image may also be an identification image acquired by searching from a server via the network based on the feature information obtained from the first sub-image. The first image is generated by superimposing the first sub-image and the second sub-image, to be displayed by the first display apparatus 103.

Figure 18:
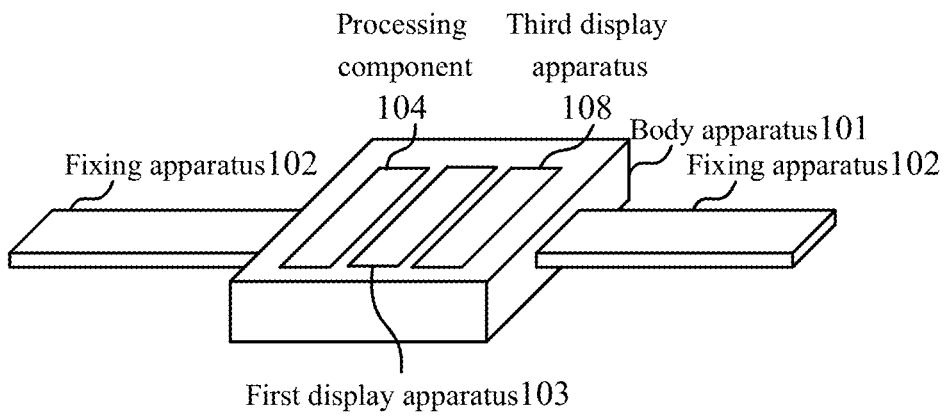
FIG. 18 is another structural block diagram illustrating an electronic device according to an embodiment of the present application.

FIG. 18 is another structural block diagram illustrating an electronic device according to an embodiment of the present application. Compared with the electronic device 100 according to an embodiment of the present application as described above with reference to FIGS. 13A to 13E, the electronic device 140 according to an embodiment of the present application further comprises a third display apparatus 108. In the electronic device 140 shown in FIG. 18, the third display apparatus 108 and the first display apparatus 103 are provided on the body apparatus 101 together. As will be readily appreciated, the present application is not limited thereto, and the third display apparatus 108 and the first display apparatus 103 may also be provided on the fixing apparatus 102 together.

The third display apparatus 108 is a display apparatus whose type is the same as that of the first display apparatus 103. That is, the third display apparatus is for forming an enlarged virtual image corresponding to a third image. The third image is associated with the first image, when the two eyes of the viewer accordingly view the first display apparatus 103 and the third display apparatus 108, respectively, the viewer can view and perceive a stereoscopic image corresponding to the first image and the third image.

Figure 19:
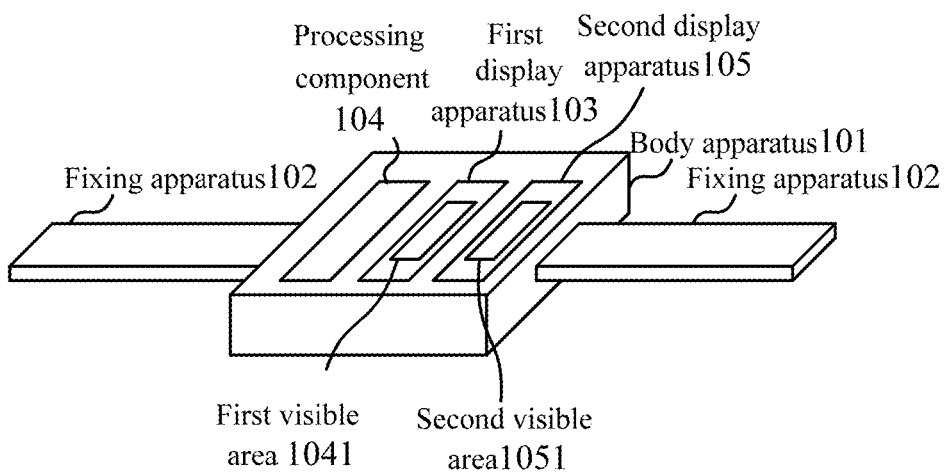
FIG. 19 is another structural block diagram illustrating an electronic device according to an embodiment of the present application.

FIG. 19 is another structural block diagram illustrating an electronic device according to an embodiment of the present application. Compared with the electronic device 100 according to an embodiment of the present application as described above with reference to FIGS. 13A to 13E, in the electronic device 150 according to an embodiment of the present application as shown in FIG. 19, the first display apparatus 103 includes a first visible area 1041, the second display apparatus 105 includes a second visible area 1051, both the first visible area 1041 and the second visible area 1051 are provided on the body apparatus 101. As will be readily appreciated, the first visible area 1041 and the second visible area 1051 may be both provided on the body apparatus 101, or alternatively, one of the first visible area 1041 and the second visible area 1051 is provided on the body apparatus 101 and the other is provided on the fixing apparatus 102. As described above, the first visible area 1041 and the second visible area 1051 are areas that are viewed by the user to perceive the displayed content in the first display apparatus 103 and the second display apparatus 105.

Figure 20A:
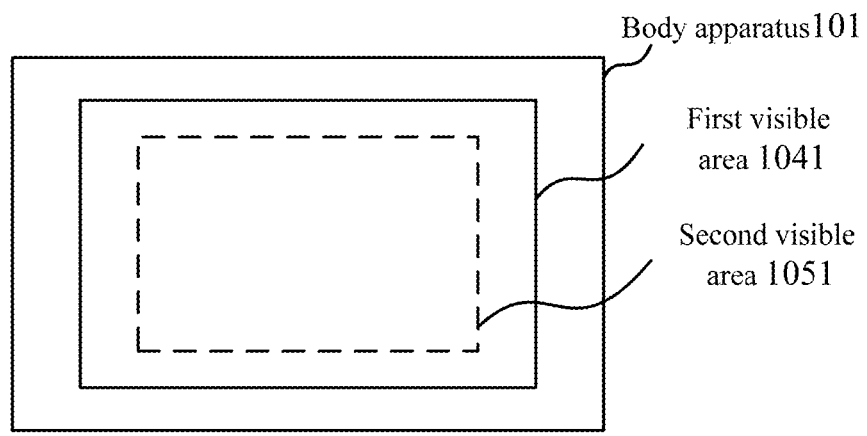
FIGS. 20A and 20B respectively are a plan view and a side view illustrating a first configuration example of a visible area of an electronic device according to an embodiment of the present application.
Figure 20B:
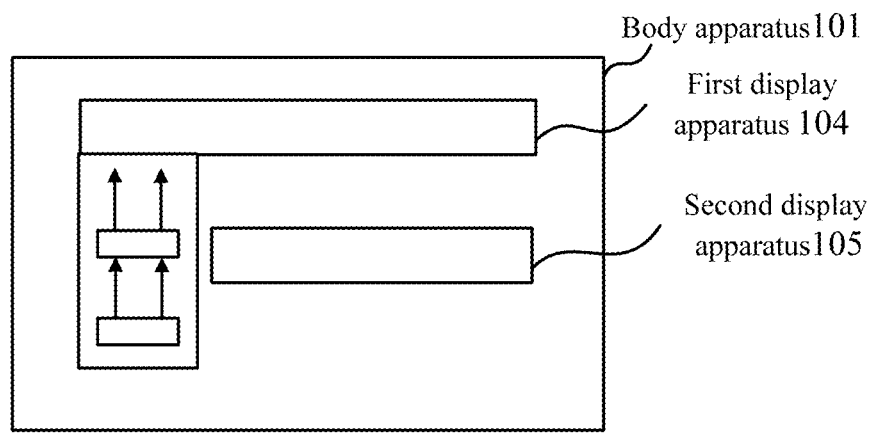

FIGS. 20A and 20B respectively are a plan view and a side view illustrating a first configuration example of a visible area of an electronic device according to an embodiment of the present application.

As shown in FIG. 20A, the first visible area 1041 and the second visible area 1051 have a first configuration example of being provided overlapped on the body apparatus 101. The present application is not limited thereto, the first visible area 1041 and the second visible area 1051 may also be provided overlapped on the fixing apparatus 102.

FIG. 20B further illustrates a side view of a first configuration example that the first visible area 1041 and the second visible area 1051 are provided overlapped. As shown in FIG. 20B, the first display apparatus 103 configured with the first visible area 1041 and the second display apparatus 105 configured with the second visible area 1051 are provided as shown in FIG. 20B, so that light transparency of at least the visible areas that are located at the outer side of the annular space or the approximate annular space within the first visible area 1041 and the second visible area 1051 satisfies a predetermined condition in the outward direction of the annular space or the approximate annular space. The predetermined condition may be that light transparency is greater than a predetermined value (such as 70%). In the example shown in FIGS. 20A and 20B, the first visible area 1041 is made at the outer side. The present application is not limited thereto, the second visible area 1051 may also be made at the outer side. By means of making the light transparency of the first visible area 1041 greater than or equal to a predetermined value, the first visible area 1041 will not affect the display function of the second visual display region 1051, thus achieving a more compact configuration.

Figure 21A:
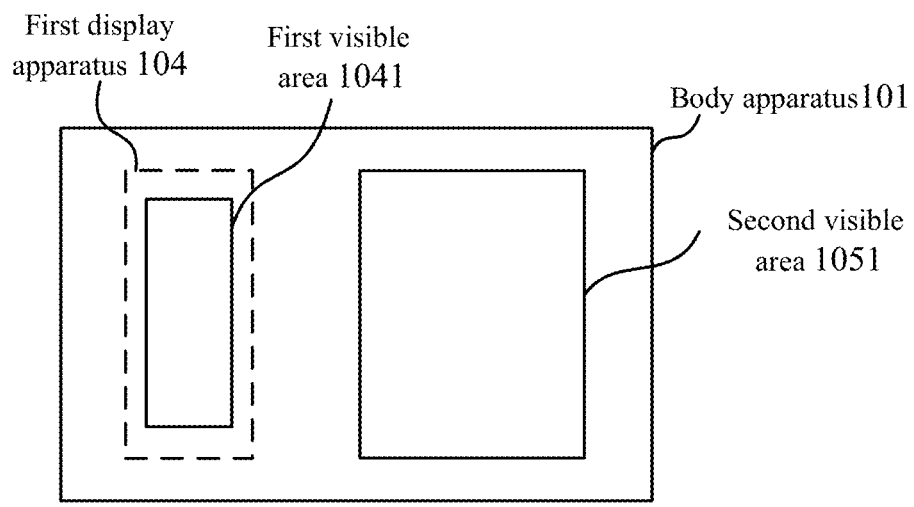
FIGS. 21A and 21B respectively are a plan view and a side view illustrating a second configuration example of a visible area of an electronic device according to an embodiment of the present application.
Figure 21B:
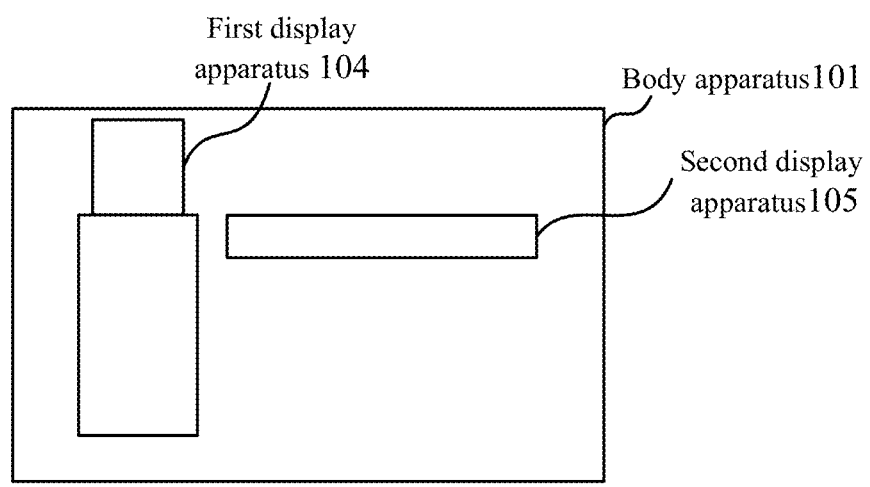

FIGS. 21A and 21B respectively are a plan view and a side view illustrating a second configuration example of a visible area of an electronic device according to an embodiment of the present application.

As shown in FIG. 21A, the first visible area 1041 and the second visible area 1051 have a second configuration example of being provided adjacently on the body apparatus 101 or the fixing apparatus 102. As shown in FIGS. 21A and 21B, the first visible area 1041 and the second visible area 1051 are provided adjacently on the body apparatus 101. The present application is not limited thereto, and the first visible area 1041 and the second visible area 1051 may be on the body apparatus 101 and the fixing apparatus 102, respectively, and a spacing between the first visible area 1041 and the second visible area 1051 is less than a threshold (e.g., 1 cm).

FIG. 21B further illustrates a side view of a second configuration example that the first visible area 1041 and the second visible area 1051 are provided overlapped. As shown in FIG. 21B, the first display apparatus 103 configured with the first visible area 1041 and the second display apparatus 105 configured with the second visible area 1051 are provided adjacently as shown therein, and the display directions of the first visible area 1041 and the second visible area 1051 both are in the outward direction of the annular space or the approximate annular space.

Figure 22A:
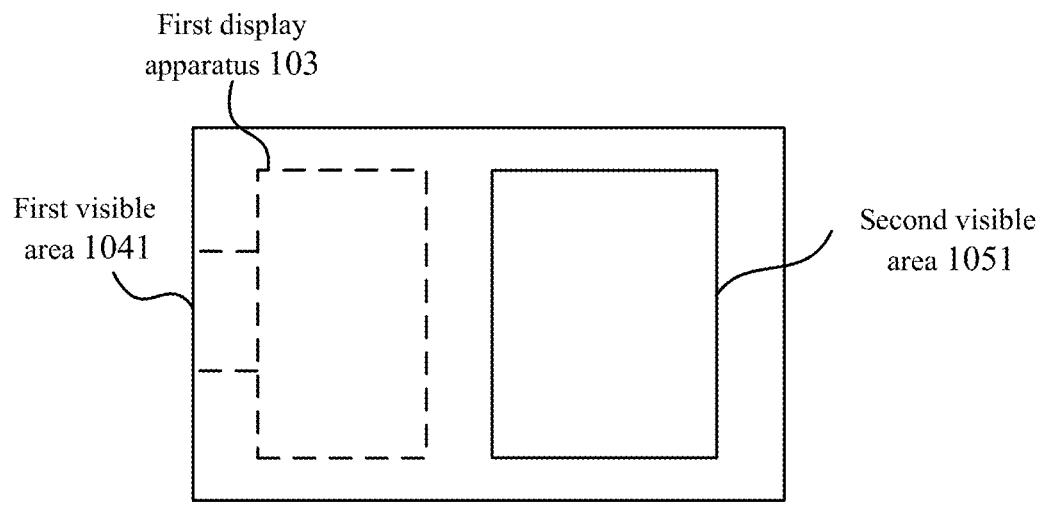
FIGS. 22A and 22B respectively are a plan view and a side view illustrating a third configuration example of a visible area of an electronic device according to an embodiment of the present application.
Figure 22B:
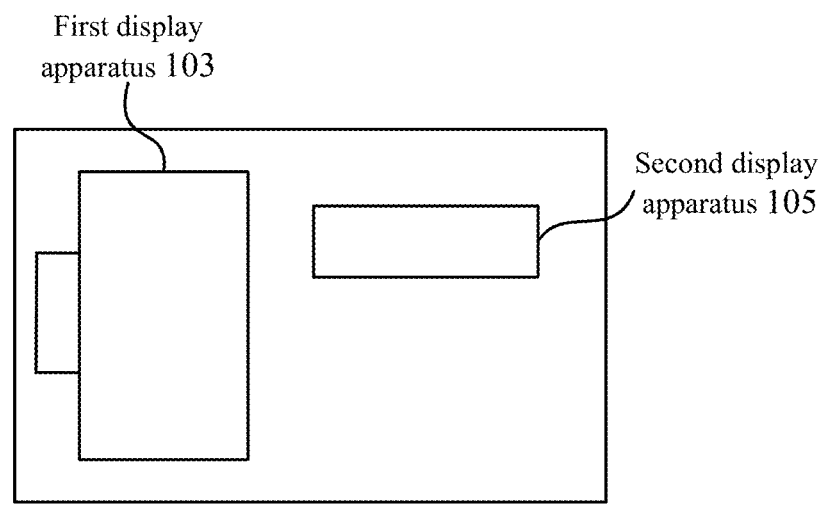

FIGS. 22A and 22B respectively are a plan view and a side view illustrating a third configuration example of a visible area of an electronic device according to an embodiment of the present application.

As shown in FIG. 22A, the first visible area 1041 and the second visible area 1051 have a third configuration example of being provided adjacently on the body apparatus 101 or the fixing apparatus 102. Different than the second configuration example as shown in FIGS. 21A and 21B, as shown in FIG. 22B, the display direction of one of the first visible area 1041 and the second visible area 1051 is in the outward direction of the annular space or the approximate annular space, and the display direction of the other is in a direction vertical to the outward direction of the annular space or the approximate annular space.

In addition, a mutual switching between an overlapped state and a non-overlapped state of the first visible area 1041 and the second visible area 1051 will be described with reference to FIGS. 23A to 23D.

FIGS. 23A to 23D respectively are a plan view and a side view illustrating first to fourth examples of a mutual movement state of a visible area of an electronic device according to an embodiment of the present application. For convenience of description, with the first visible area 1041 and the second visible area 1051 being both provided on the body apparatus 101 as example. As will be readily appreciated, of course, the present application is not limited thereto, the first visible area 1041 and the second visible area 1051 may also be both provided on the fixing apparatus 102. The body apparatus 101 further includes a first subunit 801 and a second subunit 802, one of the first visible area 1041 and the second visible area 1051 is set on the first subunit 801, and the other is set on the second subunit 802, the first subunit 801 and the second subunit 802 are connected via a connecting unit, so that the first visible area 1041 and the second visible area 1051 switch between a first status and a third status of being provided non-overlapped.

Figure 23A:
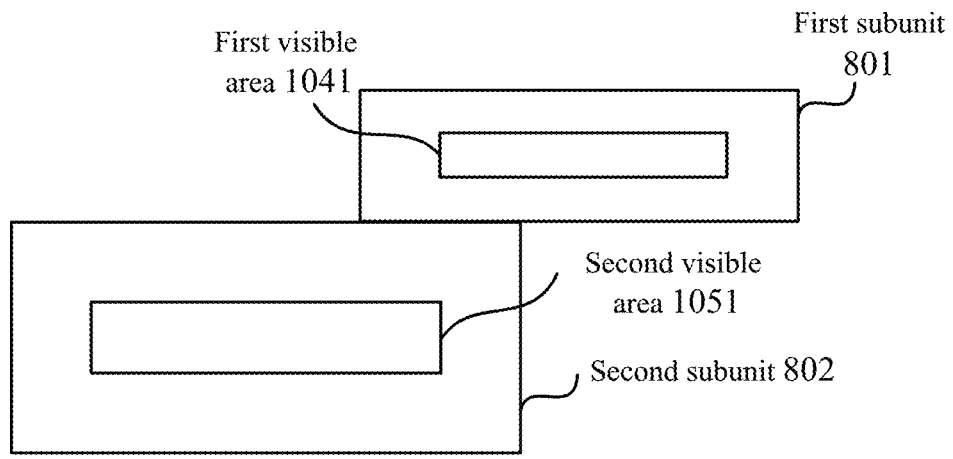
FIGS. 23A to 23D respectively are a plan view and a side view illustrating first to third examples of a mutual movement state of a visible area of an electronic device according to an embodiment of the present application.

Specifically, as shown in FIG. 23A, the first subunit 801 and the second subunit 802 are connected via a slide track component (not shown) which serves as a connecting unit. The first visible area 1041 is set within the first subunit 801, the second visible area 1051 is set within the second subunit, when the first subunit 801 and the second subunit 802 slide apart relatively, the first visible area 1041 and the second visible area 1051 may be displayed simultaneously and may also be displayed separately. Further, it may be configured that a sliding of the first subunit 801 relative to the second subunit 802 generates a control signal that controls the second visible area 1051 to display or to close. Further, when the first subunit 801 slides apart relative to the second subunit 802 to the third state, light transparency of the first visible area 1041 satisfies a predetermined condition in the outward direction of the annular space or the approximate annular space. In this way, the user can see his/her own skin through the electronic device 100, like no first visible area 1041 is set.

Figure 23B:
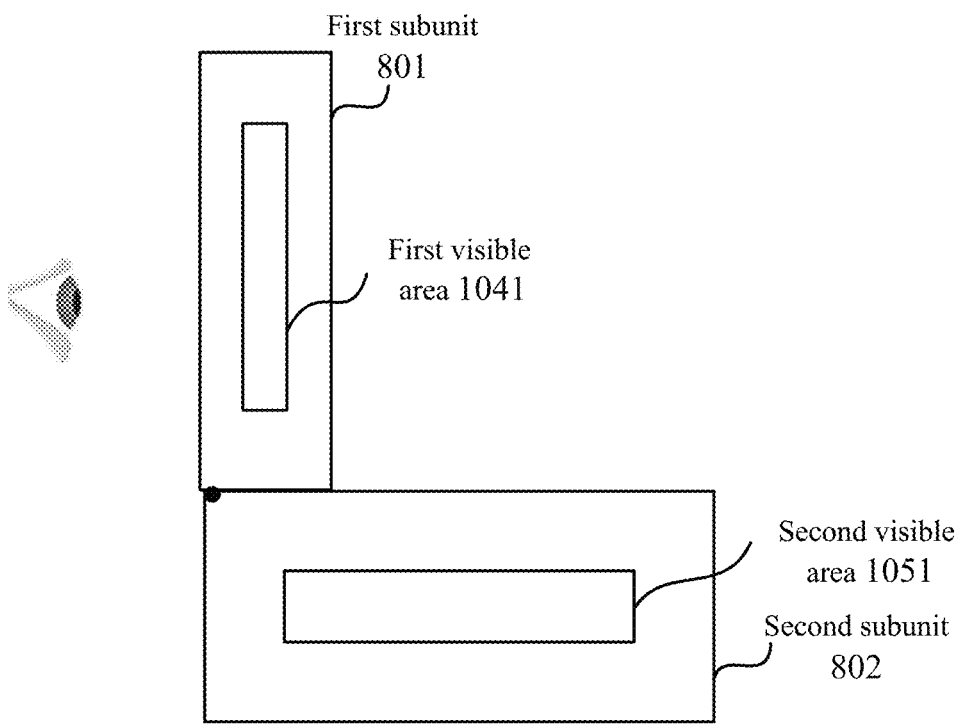
Figure 23C:
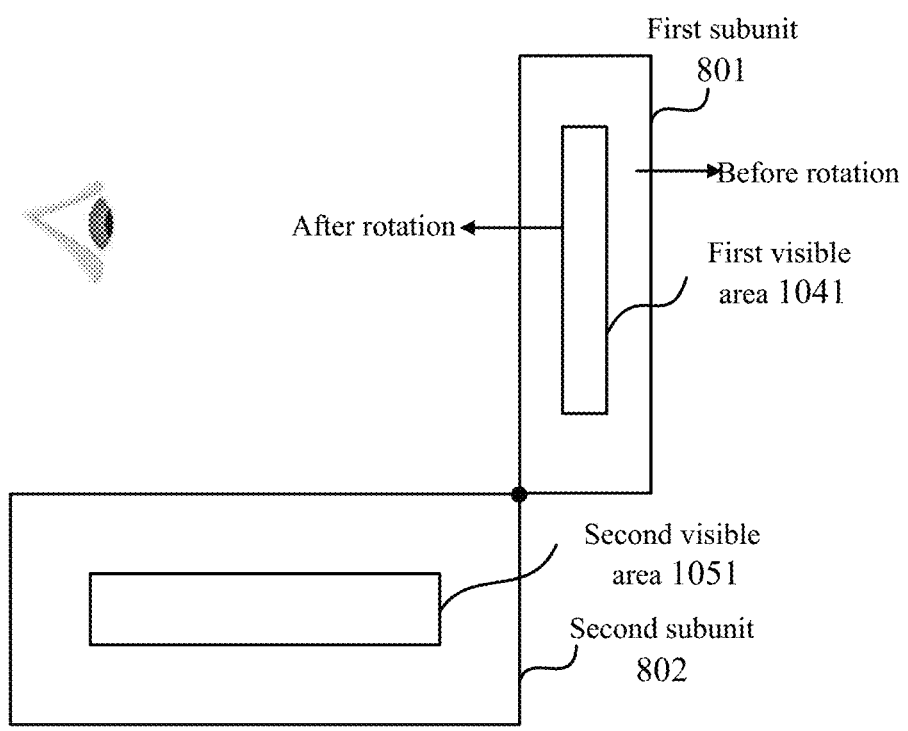
Figure 23D:
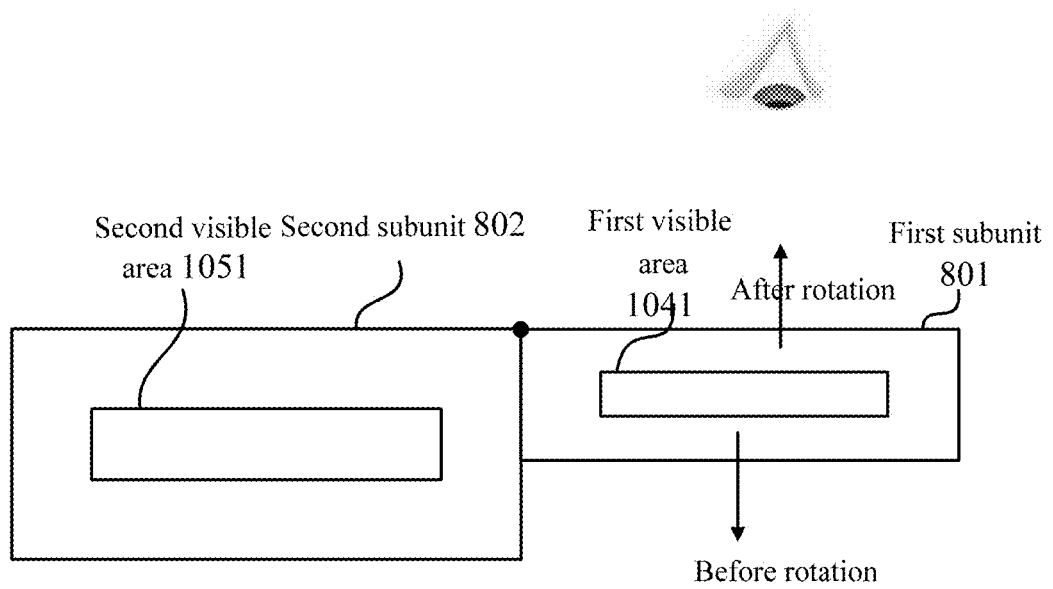

As shown in FIGS. 23B to 23D, the first subunit 801 and the second subunit 802 are connected via a rotating shaft component which serves as a connecting unit. The first visible area 1041 is set within the first subunit 801, the second visible area is set within the second subunit. When the first subunit 801 and the second subunit 802 are rotated relatively, the first visible area 1041 and the second visible area 1051 may be displayed simultaneously and may also be displayed separately. Further, it may be configured that a rotation of the first subunit 801 relative to the second subunit 802 generates a control signal that controls the second visible area to display or to close.

It should be noted that, as shown in FIGS. 23A and 23B, when the first subunit 801 is slide or rotated to switch to the third state, the display direction of the first visible area 1041 does not change, the user can continue to view the display within the first visible area 1041 in the original display direction.

As shown in FIGS. 23C and 23D, when the first subunit 801 is rotated to switch from the first state to the third state, it needs to further configure the first subunit 801 so that the user can view the display within the first visible area 1041 from the same viewing direction in the first state and the third state, thereby further enhancing user convenience. To this end, in an embodiment of the present application, the first subunit 801 may be configured as able to flip per se, the first subunit 180 flips 180 degrees while being rotated relative to the second subunit 802, so that the first visible area that turns to the rear again turns to the original display direction, that is, the display direction of the visible area 1041 remains unchanged after the rotation.

Further, in another embodiment of the present application, the first display apparatus 103 can be configured to perform bi-directional display through a light path selecting unit or an optical switching unit. Specifically, in the light path of the first display apparatus 103 (e.g., in the waveguide unit), a beam splitter is provided to guide the light beam that forms the amplified virtual image to two display directions set opposite in the first display apparatus 103, respectively. In addition, it is also possible to set an optical path switcher in the light path of the first display apparatus 103, like a reflection mirror, to guide the light beam that forms the amplified virtual image to two display directions set opposite in the first display apparatus 103, respectively. That is, when the first subunit 801 is rotated relative to the second subunit 802, in response to the rotation, the display direction of the first visible area of the first display apparatus 103 performs a bidirectional switching through the beam splitter or the optical path switcher as mentioned above, so that the display direction of the first visible area 1041 remains unchanged with regard to the user after the rotation.

FIGS. 24A to 24D are schematic diagrams illustrating a first specific configuration of a fixing apparatus of an electronic device according to an embodiment of the present application.

Figure 24A:
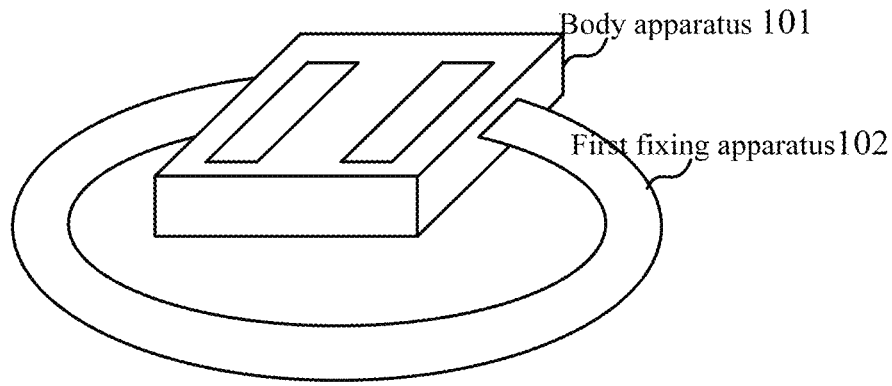
FIGS. 24A to 24D are schematic diagrams illustrating a first specific configuration of a fixing apparatus of an electronic device according to an embodiment of the present application.

As shown in FIG. 24A, the fixing apparatus 102 includes at least a fixed state in which the fixing apparatus 102 can serve as at least a portion of an annular space or an approximate annular space that satisfies a first predetermined condition, the annular space or the approximate annular space can surround periphery of a columnar body that satisfies a second predetermined condition.

Specifically, the fixing apparatus 102 and the body apparatus 101 form a closed annular space, wherein the fixing apparatus 102 and the body apparatus 101 constitute a portion of the annular space, respectively, or the fixing apparatus 102 and the body apparatus 101 form an approximate annular space with a small opening, wherein the fixing apparatus 102 and the body apparatus 101 constitute a portion of the approximate annular space, respectively. Alternatively, the annular space or the approximate annular space may also be formed by the fixing apparatus 102 alone. In an embodiment of the present application, the body apparatus 101 is a dial portion of a smart watch, and the fixing apparatus 102 is a strap portion of the smart watch. The annular space or the approximate annular space formed by the fixing apparatus 102 and the body apparatus 101 can surround the wrist of the user of the smart watch which serves as the columnar body, wherein in the case of forming an approximate annular space, a first predetermined condition that a gap of the approximate annular space in the annular circumference should be smaller than a diameter of the cylinder body that is to be surrounded should be satisfied. In addition, a diameter of the annular space or the approximate annular space should further satisfy a second predetermined condition of being greater than a diameter of the user's wrist and smaller than a diameter of the user's fist.

In order to realize the aim that the electronic device 100 can provide different ways of wearing according to user needs and usage scenarios, a diameter of the annular space or the approximate annular space formed by the first fixing apparatus 102 as shown in FIG. 24A may be changed. More specifically, a difference between a maximum and a minimum of the diameter is greater than a predetermined threshold. For example, the first fixing apparatus 102 can fix the electronic device 100 to the user's wrist, and when the user wishes to view a long time or without using the two hands, the fixing apparatus 102 can fix the electronic device 100 to the user's head. When fixed to the user's wrist, a diameter of the annular space or the approximate annular space should be about 10 cm, and when fixed to the user's head, a diameter of the annular space or the approximate annular space should be about 30 cm. The annular space or the approximate annular space formed by the first fixing apparatus 102 has a maximum of about 30 cm and a minimum of about 10 cm. A difference between a maximum and a minimum of the diameter is greater than a predetermined threshold, e.g., the predetermined threshold may be 10 cm to the least, and for example 20 cm; or alternatively, the predetermined threshold may be that the maximum is two times the minimum, and for example three times. That is, the first fixing apparatus 102 can provide the user with an adaptable adjustment range large enough to meet requirements in different usage scenarios.

Figure 24B:
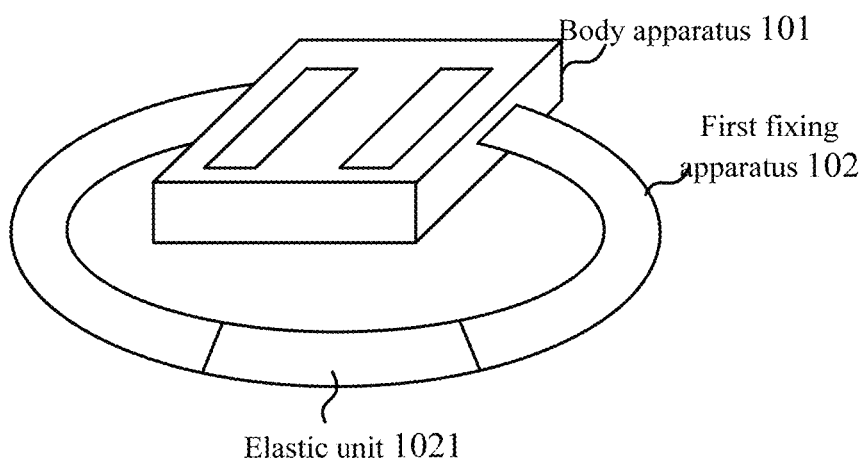
Figure 24C:
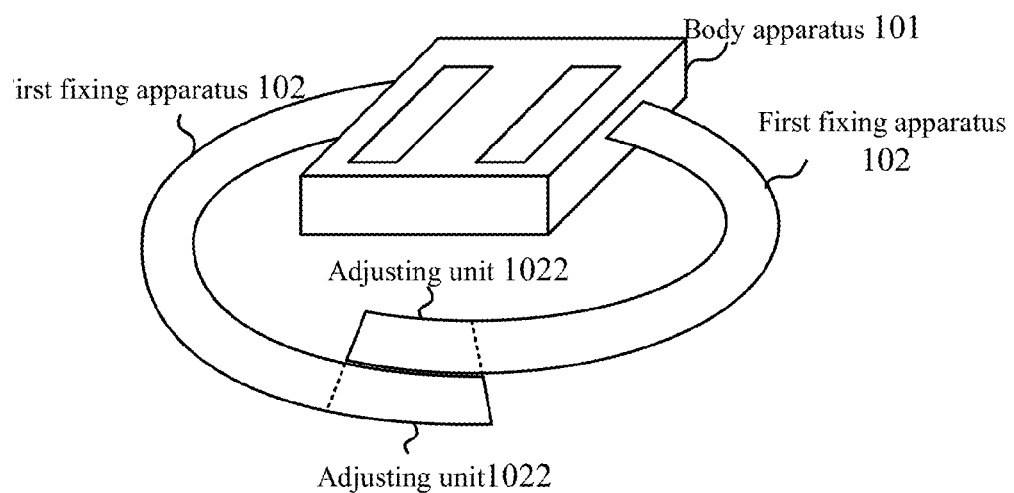
Figure 24D:
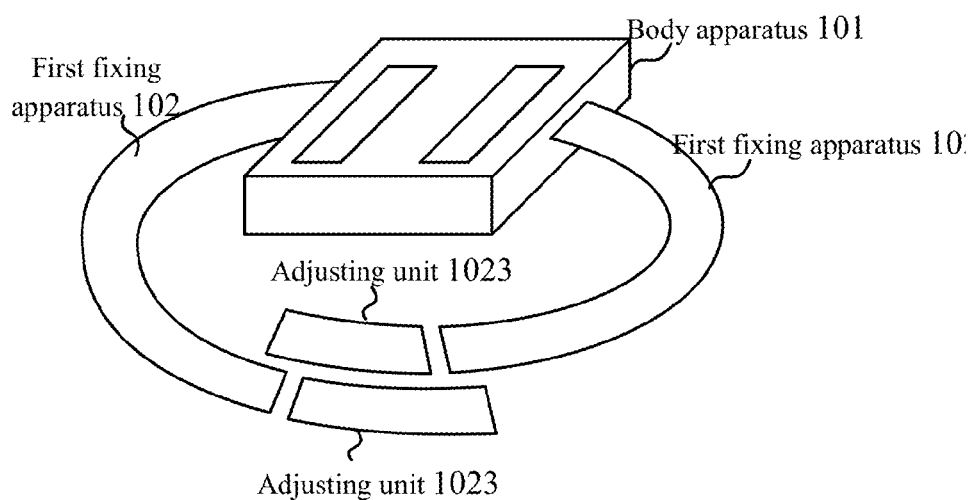

FIGS. 24B to 24D illustrate several ways to implement the first fixing apparatus 102 with an adaptable large-enough adjustment range in FIG. 24A.

As shown in FIG. 24B, the first fixing apparatus 102 may include at least one elastic unit 1021. The at least one elastic unit 1021 has a relaxed first state and a tensioned second state. When the elastic unit 1021 is completely relaxed, a diameter of the annular space or the approximate annular space is at the maximum; when the elastic unit 1021 is completely tensioned, a diameter of the annular space or the approximate annular space is at the minimum.

More specifically, the at least one elastic unit 1021 may refer to being composed by a plurality of discrete elastic subunits, or including only one complete elastic unit. In the case of including a plurality of discrete elastic subunits, it may further include a plurality of discrete elastic subunits that contain elastic space and connected by a rotating shaft, or a plurality of discrete elastic subunits that contain non-elastic space and connected flexibly.

As shown in FIGS. 24C and 24D, the first fixing apparatus 102 may further include an adjusting unit 1022 or an adjusting unit 1023 for controlling a diameter of the annular space or the approximate annular space to vary between the maximum and the minimum. In the case shown in FIG. 24C, the adjusting unit 1022 is for example a component of a belt buckle, and it achieves control over the diameter of the annular space or the approximate annular space by controlling a length of overlapped portions in the first fixing apparatus 102. In an embodiment of the present application, the adjusting unit 1022 is a rigid component having upper and lower portions that can overlap, when needs to be fixed to a columnar body with a large diameter, it is possible to reduce the length of the portions that can overlap to smaller (even until it is fully extended and has no overlapped portions), to form a larger diameter of the annular space or the approximate annular space; conversely, when needs to be fixed to a columnar body with a small diameter, it is possible to increase the upper and lower portions that can overlap to greater (even overlapped portions with three layers or more is formed), to form a smaller diameter of the annular space or the approximate annular space. After adaptive adjustment is made according to the columnar body to be fixed to, the adjusting unit 1022 can be rigidly fixed.

In the case shown in FIG. 24D, the adjusting unit 1023 is for example an extending component, which achieves control over the diameter of the annular space or the approximate annular space by extending its own length as needed. In an embodiment of the present application, the adjusting unit 1023 may include a cavity in which a retractable component is accommodated, such as a roller wheel. The retractable component such as a roller wheel can be stretched according to the diameter of the columnar body that needs to be fixed to, when needs to be fixed to a columnar body with a large diameter, it is possible to pull out the winding portion around the roller wheel, to form a large diameter of the annular space or the approximate annular space; conversely, when needs to be fixed to a columnar body with a smaller diameter, it is possible to wind more portions around the roller wheel, to form a smaller diameter of the annular space or the approximate annular space. In addition, as will be readily appreciated, the first fixing apparatus according to an embodiment of the present application is not limited thereto, it may further include an external extending component, to connect or remove a proper external extending component according to the diameter of the columnar body that needs to be fixed to.

In addition, the fixing apparatus according to an embodiment of the present application is not limited to the manner of forming an annular space or an approximate annular space. In an embodiment of the present application, the body apparatus 101 may be coupled with a different fixing apparatus via a connecting unit, thus achieving different using states to be adaptive to different wearing manners.

Figure 25A:
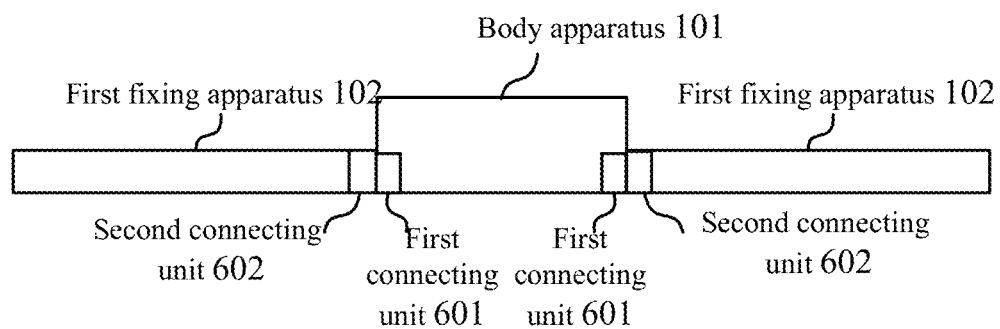
FIGS. 25A and 25B are schematic diagrams illustrating a second specific configuration of a fixing apparatus of an electronic device according to an embodiment of the present application.

As shown in FIG. 25A, the body apparatus 101 includes a first connecting unit 601, the first fixing apparatus 102 includes a second connecting unit 602, the body apparatus 101 and the first fixing apparatus 102 are connected to each other via the coupling of the first connecting unit 601 and the second connecting unit 602. In an embodiment of the present application, the body apparatus 101 is a dial portion of a smart watch, and the fixing apparatus 102 is a strap portion of the smart watch, then the first connecting unit 601 and the second connecting means 602 are riveting components of the dial and the strap.

Figure 25B:
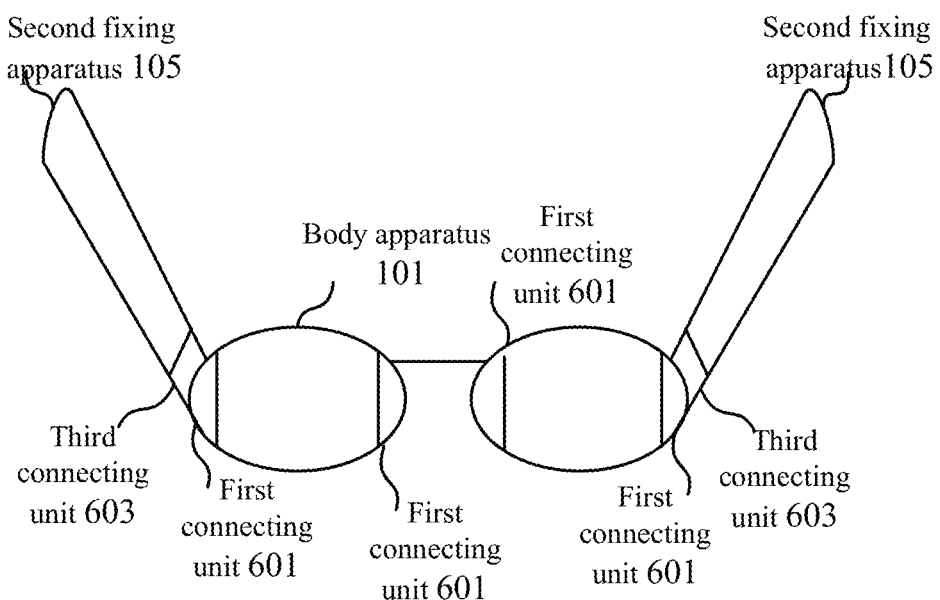

As shown in FIG. 25B, the electronic device 100 may have a using state different than that shown in FIG. 25A. The body apparatus 101 may be disconnected from the coupling with the first fixing apparatus 102, and establish a coupling with a third connecting unit 603 in the second fixing apparatus 105 via the first connecting unit 601, thus forming a second fixed state.

The body apparatus 101 may include a first sub-apparatus and a second sub-apparatus that are connected via a connecting sub-apparatus. The relative position of the first sub-apparatus and the second sub-apparatus may be changed. Specifically, in the example shown in FIGS. 25A and 25B, in an embodiment of the present application, the body apparatus 101 may include a first sub-apparatus and a second sub-apparatus that can flap or slide apart horizontally, when the relative position of the first sub-apparatus and the second sub-apparatus changes (i.e., flap or slide apart horizontally), it switches from an overlapped state to a non-overlapped state. Both sides of each of the sub-apparatus are arranged with the first connecting unit 601. When needs to couple with the second fixing apparatus 105, the body apparatus 101 is outspreaded. For example, it is outspreaded into the glass lens shape as shown in FIG. 25B from the dial shape as shown in FIG. 25A. Accordingly, the second fixing apparatus 105 may be composed of two to three sub-portions. For example, in the case where the body apparatus 101 is outspreaded into the entire front portion of the smart glasses, the second fixing apparatus 105 is two support components connected at both ends of the smart glasses (i.e., glass legs and nose holder). Further, in the case where the body apparatus 101 is a part of the entire front portion of the smart glasses, the body apparatus 101 may be fixed to the second fixing apparatus 105 (not shown in particular) as one lens or a portion of one lens (e.g., embedded with edges being aligned totally or installed via a corresponding interface). In this case, the second fixing apparatus 105 is three support components connected at both ends and in the middle of the smart glasses (i.e., glass legs and nose holder and glass frame). In the second fixed state shown in FIG. 25B, the second fixing apparatus 102 is at least a portion of the approximate rectangular space that can surround periphery of an object that satisfies a third predetermined condition. Specifically, in the case where the object is a person's head, the third predetermined condition is projecting portions with numbers and positions corresponding to the second fixing apparatus 105 (i.e., the person's ears and nose). That is, in the approximate rectangular space for surrounding the person's head, the second fixing apparatus 105 has corresponding support components corresponding to the corresponding projecting portions to be fixed, e.g., the glass legs located at two ends of the space and the nose holder located in the middle of the space form an approximate rectangular space for surrounding the person's head.

As shown in FIG. 25A and 25B, the electronic device 100 may switch between the first fixed state and the second fixed state, so that in the case of wishing to view a long time or without using the two hands, the electronic device 100 can change from the using manner of the smart watch to that of the smart glasses.

Figure 26:
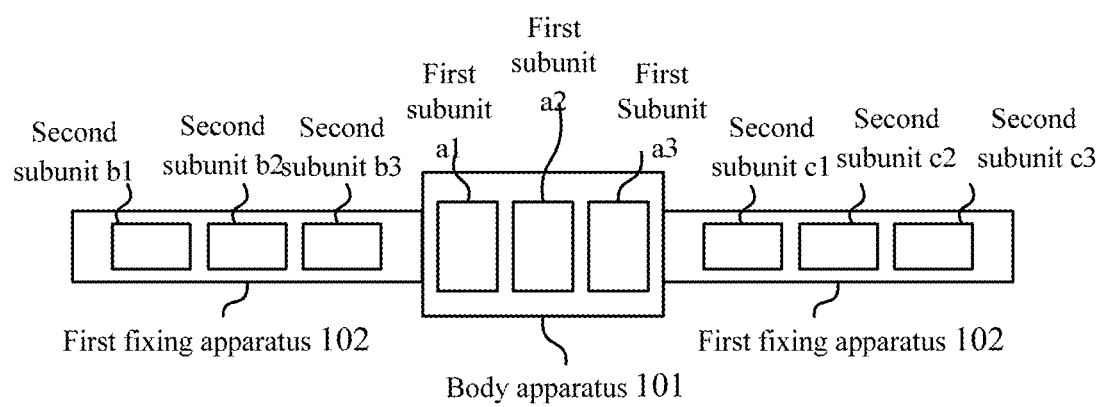
FIG. 26 is another schematic diagram illustrating an electronic device according to an embodiment of the present application.

FIG. 26 is another schematic diagram illustrating an electronic device according to an embodiment of the present application. As shown in FIG. 26, the electronic device according to the embodiment of the present application also includes a body apparatus 101 and a first fixing apparatus 102. Specifically, the body apparatus 101 includes at least one first subunit (first subunits a1 to a3), the first fixing apparatus 102 includes at least one second subunit (second subunits b1 to c3), and the at least one first subunit and the at least one second subunit are data-connected or electrically connected. The plurality of first subunits in the body apparatus 101 may be parallel to each other or connected in-serial. Similarly, the plurality of second subunits in the fixing apparatus 102 may be parallel to each other or connected in-serial. Further, the at least one first subunit may be connected to the first fixing unit 102 via the body apparatus 101, and then establish a data or electric connection with the at least one second subunit. Still further, the at least one subunit can establish a data or electric connection with the second subunit directly. The first subunit and the second subunit may be a display unit, a touch unit, a sensing unit, a circuit unit, a battery unit, a communication unit, a positioning unit, or an image capture unit and so on. The at least one second subunit is connected to the first fixing apparatus 102 via a detachable connection interface. Specifically, the plurality of second subunits may be mounted within the cavity of the first fixing apparatus 102 via a single interface. Alternatively, the plurality of second subunits may be mounted within the cavity of the first fixing apparatus 102 via a plurality of interface corresponding thereto. Further, the second subunits may be installed via an external interface and fixed to the outer surface of the first fixing apparatus 102.

Specifically, when the coupling between the body apparatus 101 and the first fixing apparatus 102 are disconnected, functions required by a current user can be achieved by the respective subunits in the body apparatus 101, so that in this case the electronic device 100 is the lowest lightweight and have the lowest power consumption. That is, the first subunit included by the body apparatus is capable of supporting the operation of the electronic device. For example, when the body apparatus 101 includes the processing component 104, the first display apparatus 103, and a necessary power supply unit (not shown), the body apparatus 101 can perform the display function of the electronic device 100. Further, when equipped with a storage unit or a communication unit, the body apparatus 101 can correspondingly perform a data storage function and a communication function, without being coupled to the first fixing apparatus 102.

One or more of the at least one first subunit may be a type of subunit different than one or more of the at least one second subunit. Thus, function configurations adaptive to different usage scenarios can be implemented by different combinations of the first subunit and the second subunit.

Further, one or more of the at least one first subunit may be the same type of subunit as one or more of the at least one second subunit. Typically, performance of the first subunit is lower than performance of the second subunit of same type. For example, a battery capacity of the first subunit that serves a power supply unit is below a battery capacity of the second subunit that serves a power supply unit; a communication distance and a communication rate of the first subunit that serves a communication unit is below a communication distance and a communication rate of the second subunit that serves a communication unit. More specifically, a sum of the battery capacity of the second subunits that serve as power supply units in the first fixing apparatus 102 is greater than a sum of the battery capacity of the first subunits that serve as power supply units. Alternatively, the battery capacity of each of the second subunits that serve as power supply units in the first fixing apparatus 102 is greater than the battery capacity of each of the first subunits that serve as power supply units. In this way, the user can freely configure the various subunits as needed in practice. For example, in the case where the user is in a travel that requires a long endurance or the like, the second subunit whose battery capacity is higher can be configured in the first fixing apparatus 102. When in the case where the user is in a movement condition that requires lightweight, the unnecessary second subunit in the first fixing apparatus 102 can be removed, and power is provided only by the first subunit in the body apparatus 101 alone which serves as the power supply unit. Further, when the body apparatus 101 is configured with the first subunit having a short-range communication capability, the electronic device 100 can establish a data connection such as Bluetooth-based with another independent electronic device (such as a smart phone), to achieve function extension of this independence electronic device, such as display extension (displaying navigation prompt information in a navigation scenario) or reminder extension (displaying caller identification information in the scenario of call-in). And when the first fixing apparatus 102 is configured with the first subunit having a long-range communication capability (e.g., a mobile communication network data communication capability or a wireless local area network data communication capability), operation of the above first subunit may be suspended (the unit having the short-range communication capability), the electronic device 100 becomes an independent electronic device that can replace for example a smart phone, especially for the second subunit having the mobile communication network (such as 3G, 4G or the latter) data communication capability (of course, if coverage of the wireless local area network is broad enough, it is possible to achieve the same effect). In other words, the user can properly configure subunits with different communication capabilities according to usage scenarios and requirements. For example, in the case where the user is convenient to carry the portable smart phone, it is possible to use only the short-range communication unit in the body apparatus 101, so that the electronic device 100 in the embodiment of the present application is used as an accessory of the smart phone; when the user is inconvenient to carry the smart phone (e.g. during exercising), it is possible to use the long-range communication unit, the electronic device 100 in the embodiment of the present application is used as a device having an independent communication function.

Further, the body apparatus 101 and the first subunit and the second subunit in the first fixing apparatus 102 may also be configured with gravity distribution of the electronic device itself being considered, thereby achieving a uniform gravity distribution of the electronic device, to provide more comfortable wearing experience. Specifically, the body apparatus 101 and the cavity of the first fixing apparatus 102 in which the first subunit and the second subunit are mounted or an external interface may be distributed symmetrically. For example, in the electronic device 100 in the state of for example a smart watch or smart glasses, the first fixing apparatus 102 provided on both sides of the body apparatus 101 has the same number of cavities or external interfaces. In addition, the subunits installed into the cavity or external interface can be configured in a uniform specification. For example, they have the same size, and have almost the same weight (a weight difference between respective subunits may be designed to be smaller than a predetermined weight threshold, e.g., 20 g).

As described above, the electronic device 100 according to the embodiment of the present application may have a variety of using states, such as the smart watch state, the smart glasses state etc. In addition, the first display apparatus 103 in the electronic device 100 needs to be designed and provided on the body apparatus 101 or the fixing apparatus 102 according to different using states and scenarios, or even configured across both the body apparatus 101 and the fixing apparatus 102. In order to achieve such electronic device 100 with a variety of modes and states, it is necessary to provide a more flexible design for the light path of the first display apparatus 103.

Figure 27A:
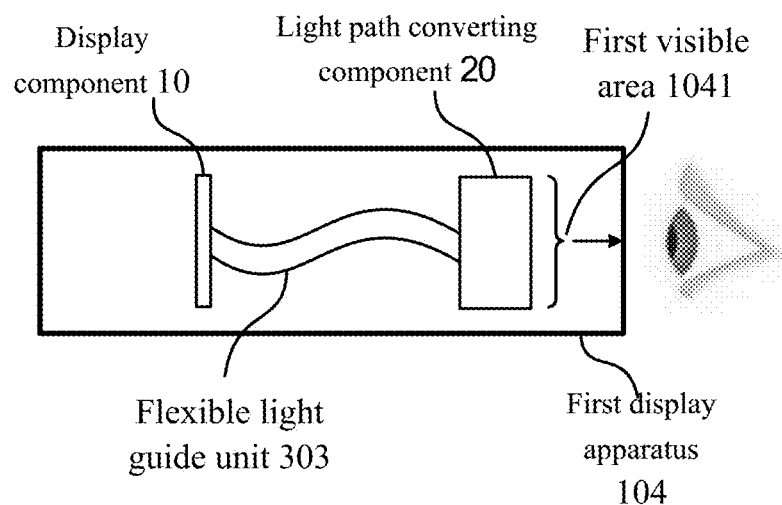
FIGS. 27A to 27C are schematic diagrams illustrating a display apparatus in an electronic device according to an embodiment of the present application.
Figure 27B:
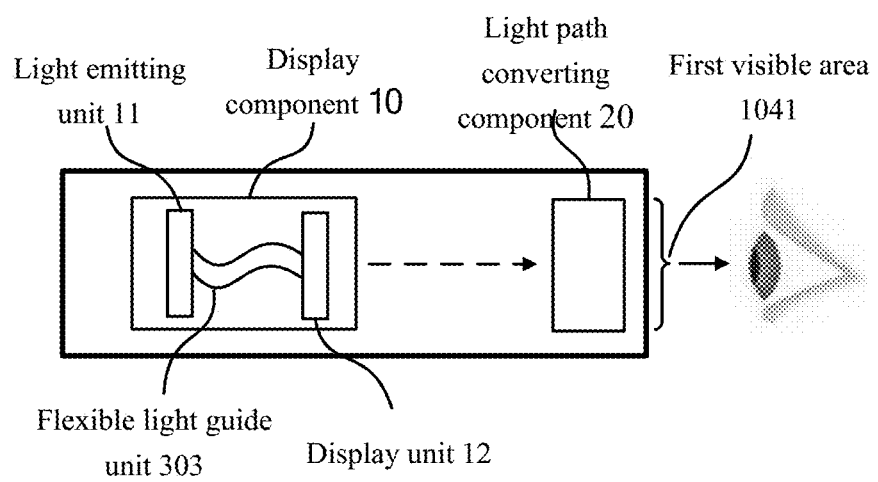
Figure 27C:
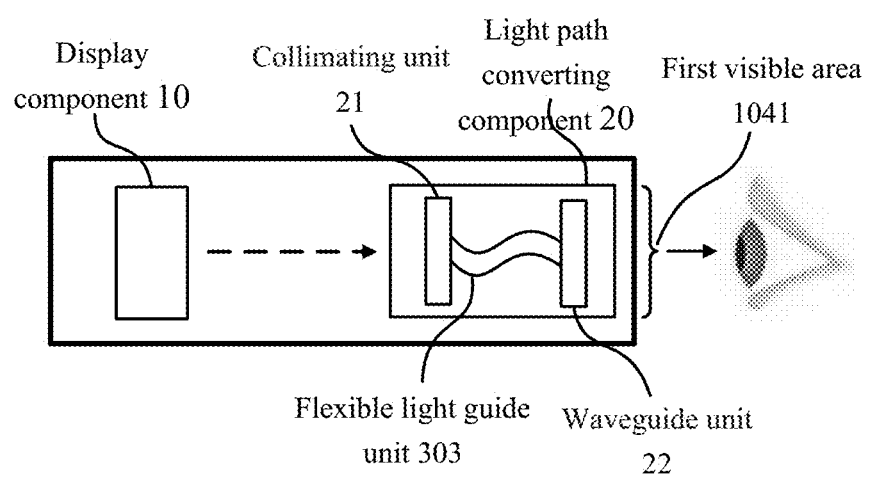

FIGS. 27A to 27C are schematic diagrams illustrating a display apparatus in an electronic device according to an embodiment of the present application. Compared with the display apparatus described with reference to FIGS. 1-12B, the first display apparatus 103 further includes a flexible light guide unit 303.

Specifically, as shown in FIG. 27A, the flexible light guide unit 303 is provided between the display component 10 and the light path converting unit 20 and configured to guide the light corresponding to the first image to the light path converting unit 20. Further, as shown in FIGS. 27B and 27C, the flexible light guide unit 303 may also be provided in the display component 10 (FIG. 27B) or in the optical path converting component 20 (FIG. 27C).

In FIG. 27A, the flexible light guide unit 303 guides the light corresponding to the first image as emitted by the display component 10 to the light path converting component 20, so that the light path converting unit 20 forms an amplified virtual image corresponding to the first image. Therefore, because of the flexible property of the flexible light guide unit 303, it can be adaptive to different design requirements, to provide bending or extending of the internal light path of the electronic device 100. As such, the display component 10 and the light path converting component 20 of the first display apparatus 103 may be provided separately. That is, the display component 10 may be provided in the body apparatus 101, whereas the light path converting component 20 may be provided in the first fixing apparatus 102, and vice versa.

In FIG. 27B, the display component 10 further includes a light emitting unit 11 and a display unit 12 (as described above with reference to FIG. 3). The flexible light guide unit 300 is provided between the light emitting unit 11 and the display unit 12 for guiding the light emitted by the light emitting unit 11 to the display unit 12. As such, the light emitting unit 11 and the display unit 12 may be provided separately. That is, the light emitting unit 11 may be provided in the body apparatus 101, whereas the display unit 12 may be provided in the first fixing apparatus 102, and vice versa.

In FIG. 27C, the light path converting unit 20 includes a collimating unit 21 and a waveguide unit 22 (as described above with reference to FIGS. 12A and 12B), the flexible light guide unit 303 is provided between the collimating unit 21 and the waveguide unit 22, for guiding the light corresponding to the first image to the waveguide unit 22. As such, the collimating unit 21 and the waveguide unit 22 may be provided separately. That is, the collimating unit 21 may be provided in the body apparatus 101, whereas the waveguide unit 22 may be provided in the first fixing apparatus 102, and vice versa.

As described above, the flexible light guide unit 303 provided in the display component 10 is for guiding the light before forming the first image, the flexible light guide unit 303 provided between the display component 10 and the light path converting unit 20 is for guiding the light corresponding to the first image after forming the first image.

The first display apparatus 103 in the electronic device according to the embodiment of the present application achieves bending or extending of the internal light path by configuring the flexible light guide unit 303 therein, so that the first display apparatus 103 may be configured across both the body apparatus 101 and the fixing apparatus 102. That is, the display component 10 and the light path converting component 20 in the first display apparatus 103 are provided on the body apparatus 101 and the fixing apparatus 102, respectively, or, the light emitting unit 11 and the display unit 12 in the display component 10 are provided on the body apparatus 101 and the fixing apparatus 102, respectively. As such, since the flexible light guide unit 303 is almost unlimited by the external physical shape, the first display apparatus 103 in the electronic device according to the embodiment of the present application can configure its internal light path flexibly, in order to meet the different using states and requirements in practice.

In the following, the using state of the electronic device according to an embodiment of the present application will be further described with reference to FIGS. 28A and 28B.

Figure 28A:
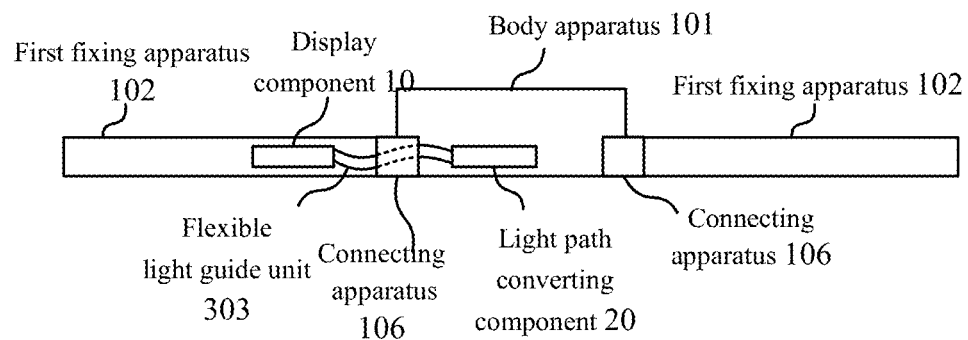
FIGS. 28A and 28B are schematic diagrams illustrating a using state of an electronic device according to an embodiment of the present application.
Figure 28B:
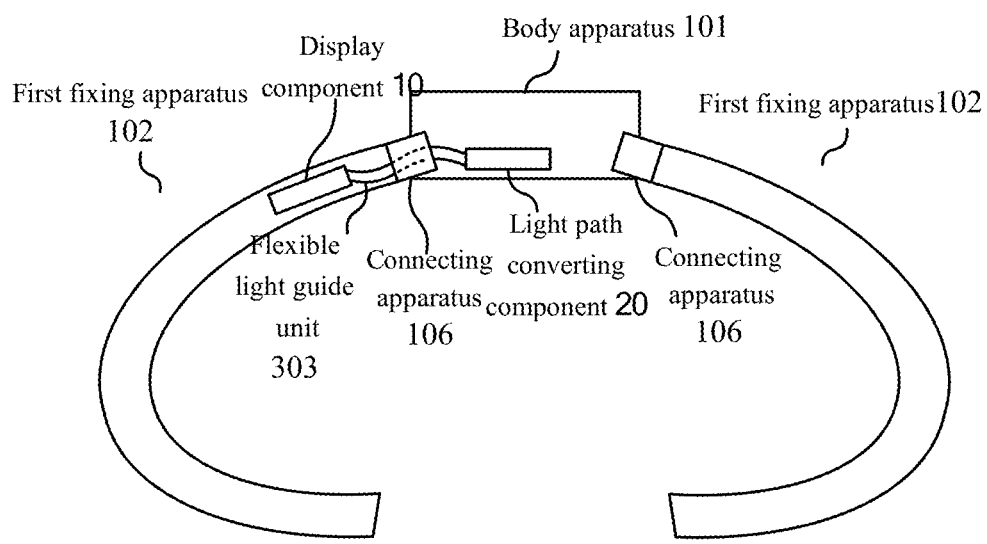

FIGS. 28A and 28B are schematic diagrams illustrating a using state of an electronic device according to an embodiment of the present application. As shown in FIGS. 28A and 28B, in the electronic device according to an embodiment of the present application, the first display apparatus 103 is configured across the body apparatus 101 and the first fixing apparatus 102. Specifically, the display component 10 in the first display apparatus 103 is provided in the first fixing apparatus 102, and the light path converting unit 20 is provided in the body apparatus 101. As described above, the electronic device according to an embodiment of the present application is not limited thereto, it is also possible that the display component 10 is provided in the body apparatus 101 and the light path converting component 20 is provided in the first fixing apparatus 102. Alternatively, it is also possible that the display component 10 or the light path converting component 20 per se are provided across the body apparatus 101 and the first fixing apparatus 102. Here, descriptions are provided with the case illustrated by FIGS. 28A and 28B as example.

In addition to the body apparatus 101 and the first fixing apparatus 102, the electronic device shown in FIGS. 28A and 28B further comprises a connecting apparatus 106 through which the body apparatus 101 and the fixing apparatus 102 are connected. Further, the body apparatus 101 and the fixing apparatus 102 can move relatively. Specifically, in a first using state as shown in FIG. 28A (non-wearing state), the body apparatus 101 and the fixing apparatus 102 connected through the connecting apparatus 106 are almost on the same plane, in a second using state as shown in FIG. 28B (wearing state), the body apparatus 101 and the fixing apparatus 102 connected through the connecting apparatus 106 move relatively, are in the position and angle different than the first using state.

Further, in the electronic device shown in FIGS. 28A and 28B, the flexible light guide unit 303 is provided corresponding to the connecting apparatus 106, so that when the body apparatus 101 and the fixing apparatus 102 are in a different relative position, the flexible light guide unit 303 can be used for guiding delivery of the light. Specifically, in the case shown in FIGS. 28A and 28B, the flexible light guide unit 303 is provided corresponding to the connecting apparatus 106 means that the flexible light guide unit 303 travels through the internal of the connecting apparatus 106. Of course, the electronic device according to an embodiment of the present application is not limited thereto, the flexible light guide unit 303 may be provided independent of the connecting apparatus 106 but bonded to each other, and thus the two are encapsulated by another encapsulation.

In the wearable electronic device equipped with no flexible light guide unit, no matter the body apparatus and the fixing apparatus of the electronic device are connected via the connecting apparatus or connected directly, when needs to configure a display unit like the first display apparatus 103, display-related components in the display apparatus must be configured on a rigid surface or an extending surface of the body apparatus or the fixing apparatus, which results in that a physical size of the display-related components that can be accommodated is very limited, or causes the plane for accommodating the display-related components to enlarge unnecessarily, thereby the display effect to the user is limited or the wearing experience to the user to restricted.

The electronic device according to an embodiment of the present application are configured with the flexible light guide unit 303, thereby it solves the above technical problem. As will be readily appreciated, the electronic device according to an embodiment of the present application is not limited to the examples described with reference to FIGS. 28A and 28B. For example, the electronic device according to another embodiment of the present application is allowed to have no the connecting apparatus 106 configured, instead, the body apparatus 101 and the fixing apparatus 102 are connected directly. Regardless of whether the connecting apparatus 106 is configured, since the first display apparatus 103 is configured with the flexible light guide unit 303, so that the respective components in the first display apparatus 103 can be configured in the body apparatus 101 or in the fixing apparatus 102, or configured across the body apparatus 101 and the fixing apparatus 102, as needed by design. The flexible property of the flexible light guide unit 303 enables to be adaptive to the external shape of different electronic device used, without restricting the display-related components within a single display rigid plane.

In the above, the display apparatus and the electronic device using the display apparatus according to the embodiments are described with reference to FIGS. 1 to 28B. The display apparatus and the electronic device using the display apparatus according to the embodiments of the present application can provide image or video display with larger size and higher resolution without being restricted by size of the wearable electronic device itself, like a smart watch, thereby enhance associated user experience. In addition, the size and weight of the display apparatus can be further reduced, to provide more comfortable wearing experience to the user. Further, it provides a more flexible component configuration manner, it is possible to adapt to specific designs aiming at different using states. Still further, it can adaptively provide a variety of wearing manners and a free combination of and switching between a plurality of functional modules based on user's different usage scenarios, needs, and the contents to be displayed. The electronic device and the display method according to the embodiments of the present application greatly enhance the user experience with regard to the wearable electronic device.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. A display apparatus comprising:
   a display component configured to output displaying light corresponding to a first image;
   a light path converting component configured to perform light path conversion on the displaying light, the light path converting component unit comprising a collimating unit and a waveguide unit;
   the collimating unit is configured to collimate the displaying light into collimated light and to lead the collimated light into the waveguide unit;
   the waveguide unit is configured to exit the collimated light to form a virtual image at a predetermined position with a size of the virtual image being greater than a display size of the display component; and
   an image acquiring component configured to receive photographing light from external side of the display apparatus via at least part of the waveguide unit to obtain a second image corresponding to the photographing light,
   wherein the displaying light exits from a predetermined area of the waveguide unit, and the photographing light enters from the predetermined area.

2. The display apparatus according to claim 1, wherein the displaying light exits from a predetermined area of the waveguide unit and the photographing light enters from the predetermined area.

3. The display apparatus according to claim 1, wherein a first light path of the displaying light includes a second light path of the photographing light or the second light path includes the first light path.

4. The display apparatus according to claim 1, wherein in the display apparatus, the first light path of the displaying light and the second light path of the photographing light are partially overlapped.

5. The display apparatus according to claim 4 further comprising a light path selecting component, wherein the collimated light transmits through the light path selecting component to be exited via the waveguide unit along the first light path and the photographing light that enters via at least part of the waveguide unit is reflected at the light path selecting component to be acquired by the image acquiring component along the second light path.

6. The display apparatus according to claim 2, further comprising a light path switching component and the display apparatus at least includes a first operating state of concurrently executing display of the first image and acquisition of the second image, wherein in the first operating state, the light path switching component leads the collimated light into the waveguide unit and leads the photographing light that enters via the waveguide unit to the image acquiring unit.

7. The display apparatus according to claim 1, wherein the display apparatus further includes a second operating state of executing display of the first image and a third operating state of executing acquisition of the second image,
   wherein in the second operating state, the light path switching component leads the collimated light corresponding to the first image into the waveguide unit, and
   wherein in the third operating state, the light path switching component leads incident light that enters via the waveguide unit to the image acquiring unit.

8. The display apparatus according to claim 6, wherein in the first operating state, when an object contacts the predetermined area, a surface that faces the predetermined area of object is irradiated by the displaying light.

9. The display apparatus according to claim 6, wherein in the first operating state, display of the first image is executed and the image acquiring component acquires biometric information of a user that is viewing the first image.

10. An electronic device, comprising:
   a body apparatus that includes a processing component configured to generate a first image to be displayed and to execute display control;
   a fixing apparatus connected with the body apparatus and configured to fix a position relationship relative to a user of the electronic device; and
   a display apparatus provided within the body apparatus and/or the fixing apparatus, wherein the display apparatus includes:
      a display component configured to output displaying light corresponding to a first image; and
      a light path converting component configured to perform light path conversion on the displaying light, wherein the light path converting component unit comprises a collimating unit and a waveguide unit,
      the collimating unit configured to collimate the displaying light into collimated light and to lead the collimated light into the waveguide unit;
      the waveguide unit configured to exit the collimated light to form a virtual image at a predetermined position, with a size of the virtual image being greater than a display size of the display component; and
      an image acquiring component configured to receive photographing light from external side of the display apparatus via at least part of the waveguide unit, to obtain a second image corresponding to the photographing light,
   wherein the displaying light exits from a predetermined area of the waveguide unit, and the photographing light enters from the predetermined area.

11. The electronic device according to claim 10, further comprising a storage component configured to store the second image corresponding to the photographing light as acquired by the image acquiring component.

12. The electronic device according to claim 11, wherein the processing component identifies an image acquired by the image acquiring component and generates a first control instruction based on the identified image to control the display component.

* * * * *